United States Patent
Hatano

(10) Patent No.: US 9,304,388 B2
(45) Date of Patent: Apr. 5, 2016

(54) THREE-DIMENSIONAL IMAGING DEVICE AND THREE-DIMENSIONAL IMAGING METHOD

(75) Inventor: Toshinobu Hatano, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 851 days.

(21) Appl. No.: 13/621,104

(22) Filed: Sep. 15, 2012

(65) Prior Publication Data

US 2013/0010084 A1    Jan. 10, 2013

Related U.S. Application Data

(63) Continuation of application No. PCT/JP2011/001726, filed on Mar. 24, 2011.

(30) Foreign Application Priority Data

Apr. 19, 2010  (JP) .................................. 2010-095732

(51) Int. Cl.
- *H04N 13/02* (2006.01)
- *G03B 35/08* (2006.01)
- *H04N 13/00* (2006.01)

(52) U.S. Cl.
CPC ............ *G03B 35/08* (2013.01); *H04N 13/0007* (2013.01); *H04N 13/0239* (2013.01); *H04N 13/0246* (2013.01)

(58) Field of Classification Search
CPC .................................................. H04N 13/0438
USPC .................. 349/15; 348/362, 54, 49, 343, 42; 386/124, 341, 356
See application file for complete search history.

(56) References Cited

U.S. PATENT DOCUMENTS

| 2008/0239064 A1 | 10/2008 | Iwasaki | |
| 2013/0016186 A1* | 1/2013 | Atanassov | H04N 13/0246 348/47 |
| 2013/0169761 A1* | 7/2013 | Inoue | G03B 17/14 348/49 |

FOREIGN PATENT DOCUMENTS

| JP | 05-130646 | 5/1993 |
| JP | 08-088868 | 4/1996 |
| JP | 09-133852 | 5/1997 |

(Continued)

OTHER PUBLICATIONS

International Search Report of PCT/JP2011/001726 with mail date of May 1, 2011.

(Continued)

*Primary Examiner* — Jamie Atala
*Assistant Examiner* — Masum Billah
(74) *Attorney, Agent, or Firm* — McDermott Will & Emery LLP

(57) ABSTRACT

A camera processor image-processes an image for left eye captured by a left-eye image capturing unit and an image for right eye captured by a right-eye image capturing unit to generate a parallax image of the left-eye image and the right-eye image. A vertical timing adjuster adjusts timings of driving a left-eye image sensor and a right-eye image sensor using a frame synchronizing drive controller to reduce as close to zero as possible an amount of vertical displacement between a framing position of a target object image in the left-eye image and a framing position of a target object image in the right-eye image.

21 Claims, 17 Drawing Sheets

(56) References Cited

FOREIGN PATENT DOCUMENTS

| JP | 11-045334 | 2/1999 |
| JP | 2004-032244 | 1/2004 |
| JP | 2007-155428 A | 6/2007 |
| JP | 2008061259 A * | 3/2008 |
| JP | 2008-252254 | 10/2008 |
| JP | 2009-094632 A | 4/2009 |

OTHER PUBLICATIONS

Japanese Office Action issued in Japanese Application No. 2012-511522 dated Jul. 14, 2014.

* cited by examiner

F I G. 1
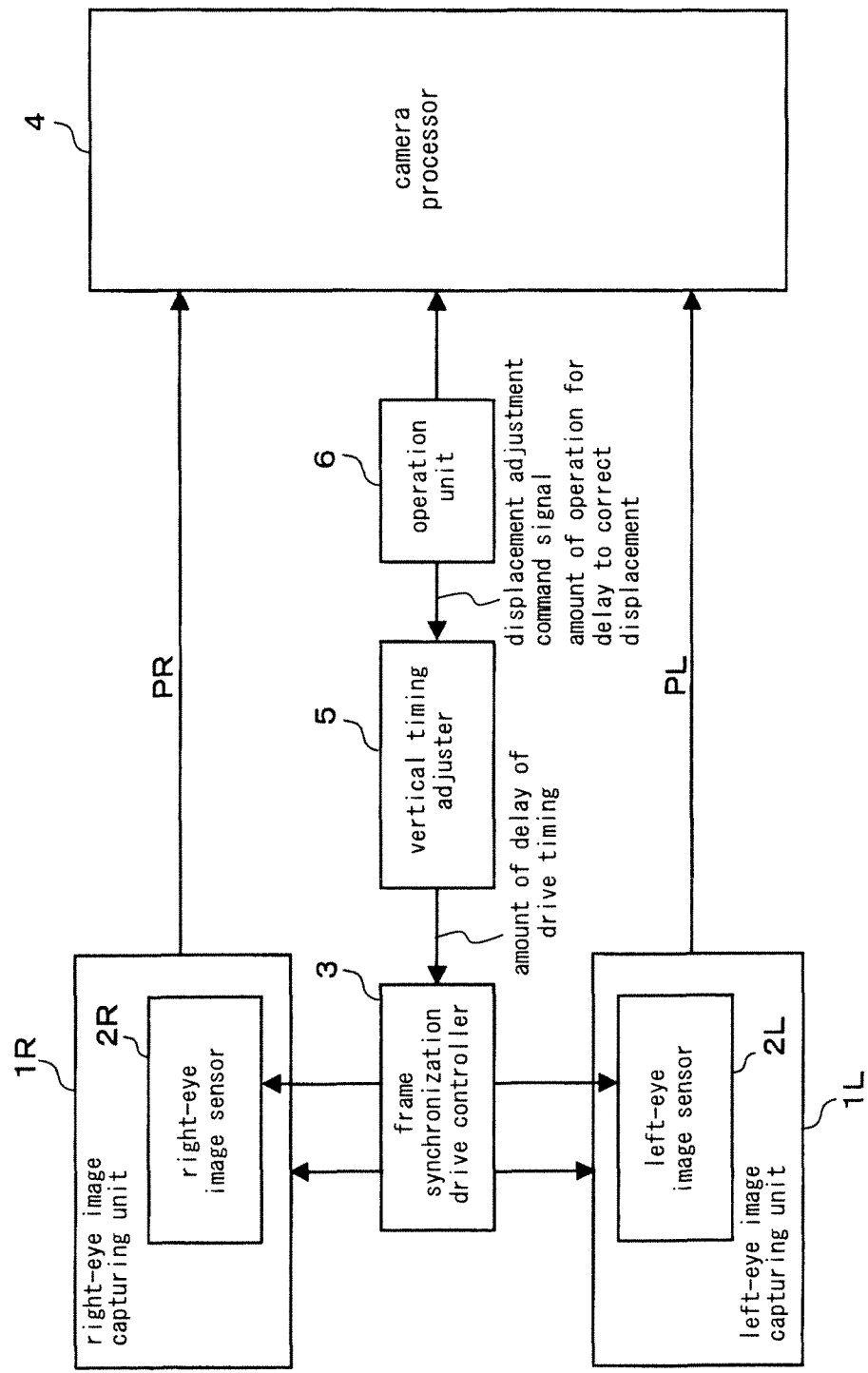

F I G. 3
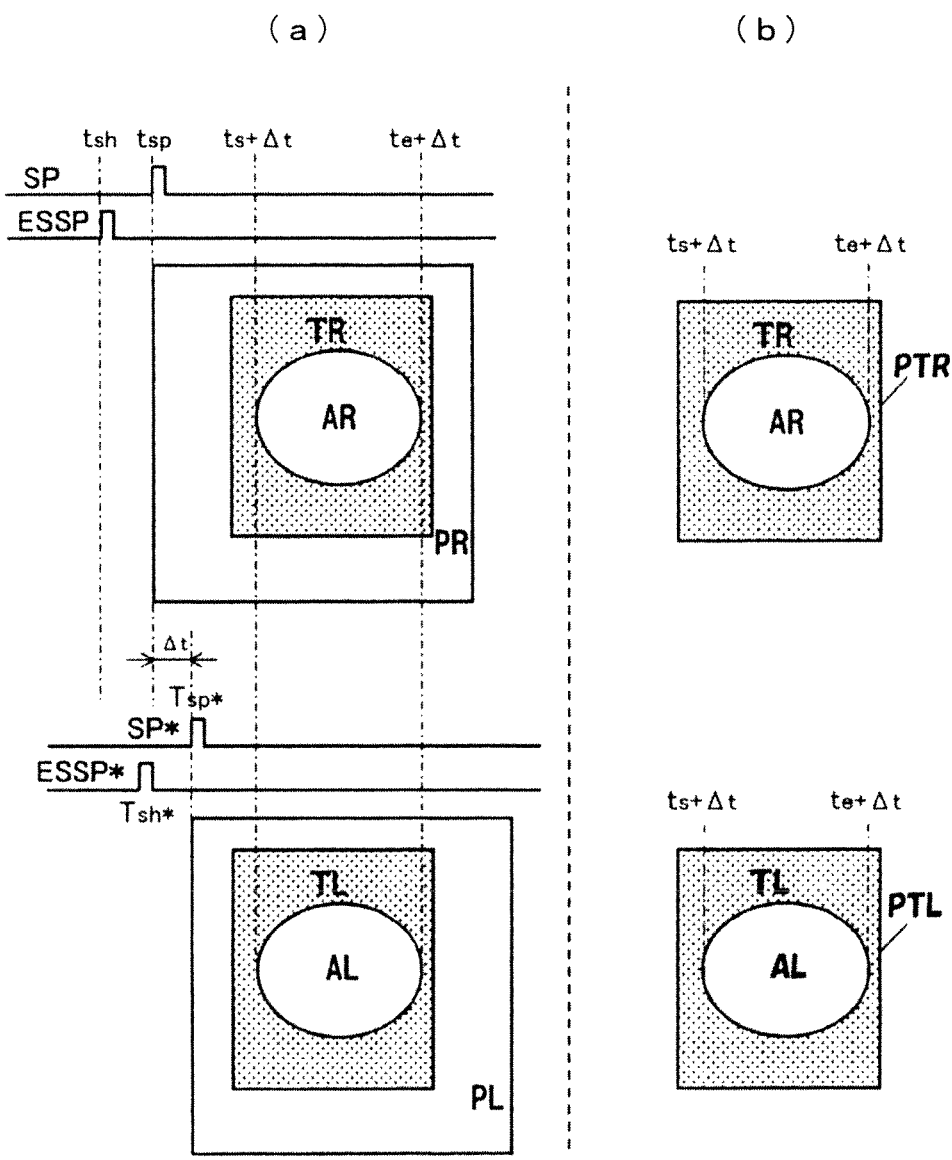

F I G. 5
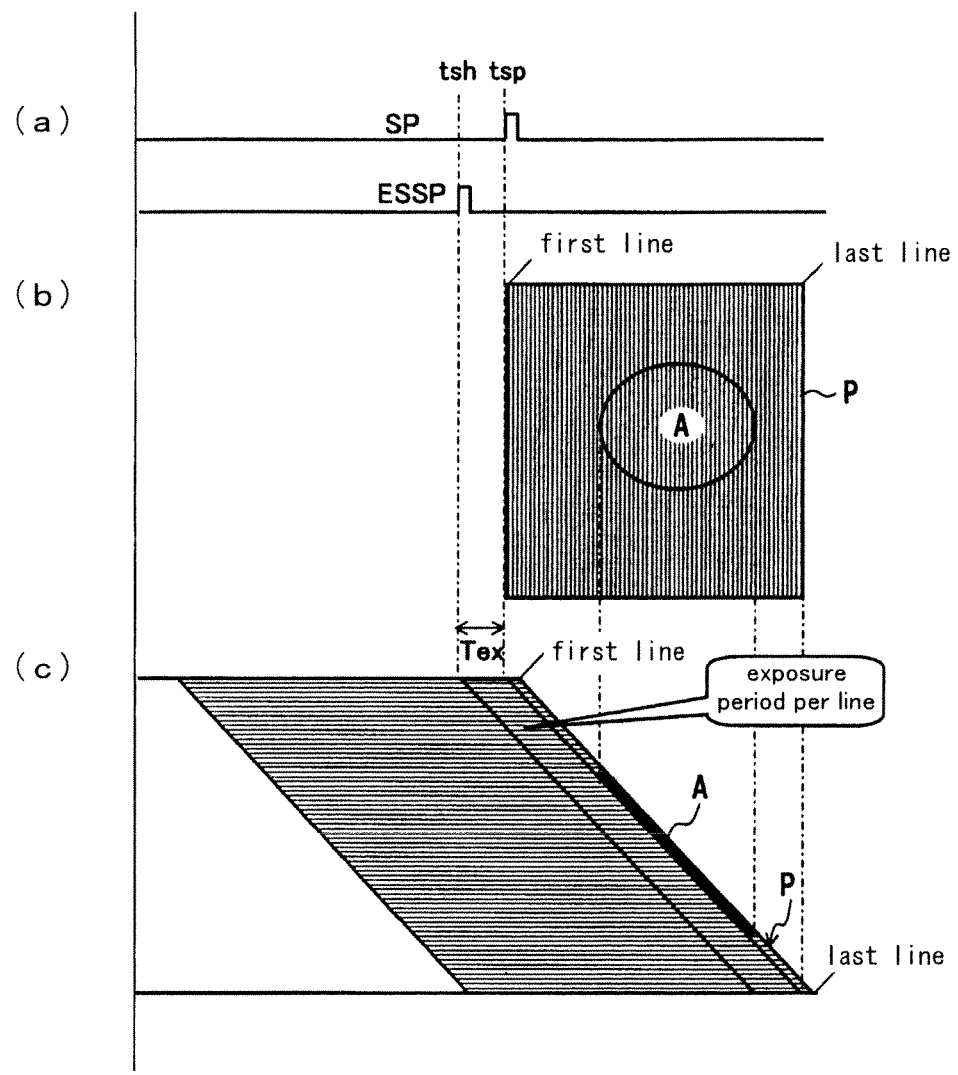

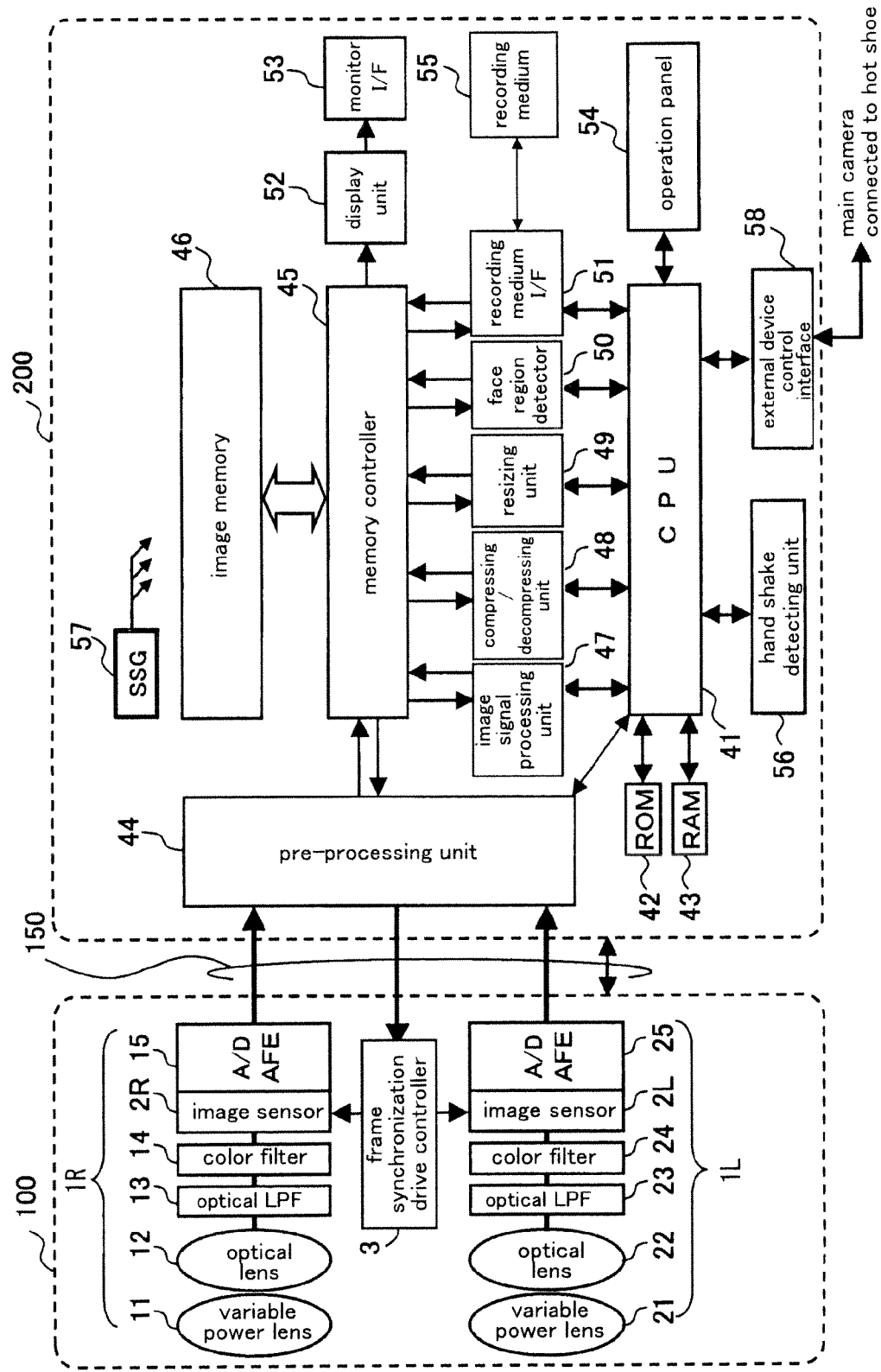
F I G. 6

THREE-DIMENSIONAL IMAGING DEVICE AND THREE-DIMENSIONAL IMAGING METHOD

RELATED APPLICATIONS

This is a Continuation Application based on International Application No. PCT/JP2011/001726, filed on Mar. 24, 2011, which in turn claims the benefit of Japanese Application No. 2010-095732 filed on Apr. 19, 2010, the disclosures of which Applications are incorporated by reference herein.

BACKGROUND OF THE INVENTION

1. Field of the Invention

The invention relates to a three-dimensional imaging device including a pair of left and right image capturing units and a three-dimensional imaging method, more particularly to a technology for correcting any displacement between two images respectively captured for left and right eyes by the image capturing units caused by a shift between optical axes of the image capturing units, thereby ensuring simultaneity of the images.

2. Description of the Related Art

According to two-eye stereoscopic cameras so far disclosed, an image of a target object to be imaged is captured by a pair of left and right image capturing units to obtain a three-dimensional image from the captured left and right images. Conventionally, it is unavoidable that optical axes of a pair of left and right image capturing units are shifted horizontally and vertically relative to each other. This invention focuses on the vertical shift between the optical axes. To conventionally correct any vertical displacement between images respectively captured for left and right eyes due to such a vertical shift between the optical axes, the displacement is detected, and feedback of the detected displacement is transmitted to a mechanical drive unit provided in a multi-axial camera platform to adjust angles of depression and angles of elevation of the image capturing units respectively capturing the right-eye and lefty-eye images, thereby correcting the displacement. This technique mechanically corrects the displacement (for example, see the Patent Reference 1).

In some conventional cameras, image capturing units are each embedded with a variable power lens constituting a zoom lens so that a magnifying power is variable. In these cameras, any vertical displacement between the left-eye image and the right-eye image is increased by an error between different magnifying powers of the variable power lenses. To correct the displacement between the two images due to such an error, the generated displacement is detected, and feedback of the detected displacement is transmitted to a variable power lens drive mechanism so that the error is cancelled. This technique too mechanically corrects the displacement. (for example, see the Patent Reference 2).

PRIOR ART DOCUMENTS

Patent References

Patent Reference 1: Unexamined Japanese Patent Applications Laid-Open No. 05-130646
Patent Reference 2: Unexamined Japanese Patent Applications Laid-Open No. 09-133852

SUMMARY OF THE INVENTION

Problem to be Solved by the Invention

The conventional technical means disclosed in the Patent References 1 and 2 both mechanically adjust the displacement. These mechanically performed adjustments naturally have some limit, failing to completely correct any displacement because of inevitable variability of mechanical devices even in a pair of image capturing units of exactly the same spec. The other problems in these mechanically performed adjustments are; the optical axes unavoidably shift relative to each other when the image capturing units are mounted, and such a shift between the optical axes is also caused by any changes of the imaging units with time and motion-related vibrations. In the case where the images are captured and combined with the axial shift left unadjusted, a three-dimensional image thereby obtained has a poor image quality.

In the case of an MOS (Metal Oxide Semiconductor) image sensor operated by manipulating a rolling shutter configured for per-line read, in particular, any displacement between images respectively for left and right eyes due to the shift between the optical axes leads to positional mismatch of these images read as parallax images for a three-dimensional image. As a result, a viewer may feel a sense of discomfort or suffer severe eyestrain because of the mismatch enhanced by a three-dimensional effect. These problems are serious when a moving subject is imaged, and the mismatch is worsened when the images are obtained by telescopic zooming. Neither of the Patent Reference 1 nor the Patent Reference 2 recognizes these technical problems of the rolling shutter, let alone discussing any breakthrough to solutions, leaving the problems unsolved.

The invention was accomplished under the circumstances. The invention is aimed at capturing a three-dimensional image with a good image quality including no displacement between left and right images by correcting any displacement between two images respectively captured for left and right eyes by a pair of left and right image capturing units caused by a shift between optical axes of the image capturing units, thereby ensuring simultaneity of the images.

Means for Solving the Problem

The invention solves the conventional technical problems through the following technical approaches. Any bracketed numerals, such as <1>, <2>, <3>, . . . , correspond to claim numbers in the Scope of Claims. For the convenience of description, some of these bracketed numerals may be serially recited, while the others may be skipped or recited back and forth.

<1> The invention solves the conventional technical problems based on the technical idea that any image displacement, which is spatially generated between images, is converted to a temporal displacement and adjusted, more specifically, in the manner of adjustment of a drive timing. The technical idea is described referring to FIG. 1.

A three-dimensional imaging device includes image capturing units 1L and 1R respectively for left and right eyes, a frame synchronizing drive controller 3 which drives image sensors 2L and 2R of the image capturing units 1L and 1R in a frame synchronizing manner, and a camera processor 4 which image-processes left and right images captured by the left-eye image capturing unit 1L and right-eye image capturing unit 1R to generate parallax images which is basic image data of a three-dimensional image. The frame synchronizing drive controller 3 ensures an equal operation frequency between the left-eye image capturing unit 1L and the right-eye image capturing unit 1R.

The three-dimensional imaging device further includes a vertical timing adjuster 5 which adjusts any vertical displacement spatially generated between images to PL and PR respectively for left and right eyes captured by the left-eye image capturing unit 1L and the right-eye image capturing unit 1R due to a shift between optical axes of the image sensors 2L and 2R. The vertical timing adjuster 5 adjusts timings of driving the image sensors 2L and 2R using the frame synchronizing drive controller 3 so that an amount of vertical displacement between a framing position of an object images AL in the left-eye image PL and a framing position of an object images AR in the right-eye image PR is reduced as close to zero as possible. At the time, the vertical timing adjuster 5 adjusts the timing of driving one of the left-eye image sensor 2L and the right-eye image sensor 2R, wherein the drive timing of either one of the two image sensors is arbitrarily adjustable. The adjustment of the drive timing is thus arbitrarily decided to deal with different displacements, for example, the right-eye image PR may be displaced vertically downward relative to the left-eye image PL or the left-eye image PL may be displaced vertically downward relative to the right-eye image PR. The timings of driving the left-eye image sensor 2L and the right-eye image sensor 2 are independently adjusted separately from each other.

A more detailed description is given below. In the event of any vertical shift between optical axes of the image capturing units 1L and 1R when a target object is imaged at the same time by the left-eye image capturing unit 1L and the right-eye image capturing unit 1R, a vertical displacement is spatially generated between the left-eye image PL and the right-eye image PR captured by an equal timing. This is described referring to FIG. 2. The drawings conceptually illustrate a reading process of the rolling shutter. A horizontal direction on the drawings represents time axis, and time advances from left to right. The left-eye image PL and the right-eye image PR drawn there in a rectangular shape are rotated through 90 degrees anticlockwise as compared to images conventionally drawn, meaning that the images PL and PR are drawn so that spatially vertical axes thereof are along the direction of time axis. A vertical direction on the drawings represents a spatially horizontal direction of the images PL and PR. The illustrations of these drawings including (†1) (will be described in detail later referring to FIG. 5) are particularly for an MOS image sensor operated by a rolling shutter, wherein image data is serially read per line vertically on the drawings (to right on the drawings) from the image sensor immediately after exposure of a predetermined duration is completed. A line for per-line read is a line of pixels along the vertical direction on the drawings. AL is a target object image to be read from the left-eye image PL, and AR is a target object image to be read from the right-eye image PR. In the illustrated object images AL and AR of the images PL and PR, time advances downward (to right).

Referring to FIG. 2 a), of positions (AL, AR) of the same target object in a frame at a time point on imaging surfaces of the left-eye and right-eye image sensors 2L and 2R, the position in the right-eye image PR is displaced vertically downward (to right on the drawings) relative to the position in the left-eye image PL because of a shift between optical axis of these image sensors, meaning that the target object image AR of the right-eye image PR is displaced vertically downward relative to the target object image AL of the left-eye image PL. In the drawings, $\Delta t$ represents an amount of displacement time. The amount of displacement time is the expression in the form of time of the vertical displacement of the framing position of the target object image AR in the right-eye image PR relative to the vertical displacement of the framing position of the target object image AL in the left-eye image PL. In the case where the images PL and PR, in which the target object images AL and AR are displaced relative to each other, are directly used as parallax images and combined, a three-dimensional image thereby obtained has a poor image quality with the vertical displacement uncorrected therein.

It is sought to vertically adjust the illustrations of the left-eye image and the right-eye image to match illustrations of FIG. 3 b) vertically (laterally on the drawings, direction of time axis).

First, left and right trimming areas TL and TR are set to detect the vertical displacement between the framing positions of the target object images AL and AR in the left-eye image PL and the right-eye image PR as illustrated in FIG. b) to define spatial ranges. The left and right trimming areas TL and TR are set so that a relative position of the target object image AL in the left-eye trimming area TL and a relative position of the target object image AR in the right-eye trimming area TR are equivalent each other. Spatially, these trimming images PTL and PTR respectively for left and right eyes are topologically equivalent to each other in the trimming areas TL and TR as illustrated in FIG. 2 c). However, such a topological equivalence is not a perfect solution because the problem of temporal displacement still remains unsolved. It is the most significant advantage of the invention to solve the problem of temporal displacement, which is described below in detail.

When a common readout-start pulse SP is used to read the left-eye trimming image PTL from the left-eye image sensor 2L and read the right-eye trimming image PTR from the right-eye image sensor 2R, as illustrated in FIG. 2 b), the right-eye trimming image PTR may be readable with no particular problem because of its optical axis relatively upward, however, the left-eye trimming image PTL having an optical axis relatively downward is obtained from a scene temporally different to (earlier than) that of right-eye trimming image PTR. This temporal difference is generated because, as illustrated in FIG. 2 c), the target object image AL of the left-eye trimming image PTL is captured during a range of time from ts to te (dotted line on the lower side in the drawing), whereas the target object image AR of the right-eye trimming image PTR is captured during a range of time from (ts+$\Delta$s) to (te+$\Delta$t) (solid line on the upper side of the drawing). Therefore, the target object images AL and AR are respectively obtained from temporally different scenes. In the case where the target object is a moving object, there are more differences between the target object images AL and AR, such as positions (coordinates), contour shapes, and sizes. When the images thus largely different to each other are combined, a three-dimensional image obtained from the images, in which the displacement is left unsolved, is visually recognized as an acceptable image in which a different depth position changes depending on different moving speeds and directions of the moving object, causing a considerable sense of discomfort. This is the real problem to be solved by the invention.

To serve the purpose, the invention uses, to read the left-eye trimming image PTL, a readout-start pulse SP* delayed by the displacement time $\Delta t$ as compared to the readout-start pulse SP used to read the right-eye trimming image PTR as illustrated in FIG. 3 a). The vertical timing adjuster 5 is responsible for generating the readout-start pulse SP* delayed by the displacement time $\Delta t$ as compared to the reference readout-start pulse SP.

As a result, the left-eye trimming image PTL having the optical axis relatively downward is obtained from a scene by an almost equal timing to the right-eye trimming image PTR as illustrated in FIG. 3 b). When the left-eye trimming image PTL and the right-eye trimming image PTR thus obtained are combined, therefore, the problem of any displacement is successfully solved in a three-dimensional image thereby obtained.

Describing how to read the illustration of FIG. 3 b), the right-eye target object image AR on the upper side is obtained during a range of time from (ts+Δt) to (te+Δt), while the left-eye target object image AL on the lower side is obtained during the same range of time from (ts+Δt) to (te+Δt). The left and right trimming images PTL and PTR thus obtained by a substantially equal timing are positionally consistent in the vertical direction because of using the readout-start pulse SP* delayed by the displacement time Δt relative to the readout-start pulse SP on the upper side as illustrated in FIG. 3 a).

In the description given so far, one of the image sensors which captures the image relatively downward is the left-eye image sensor 2L, however, may be the right-eye image sensor 2R. In that case, the right-had side and the right-hand side described so far are simply laterally reversed in a symmetric manner.

According to the invention, the vertical timing adjuster 5 spatially equalizes the relative positions of the left-eye image and the right-eye image used as parallax images of the same object captured at a time point (trimming images PTL and PTR) through the adjustment of such a time-based factor as the drive timing of the image sensor 2L, 2R.

According to the prior art, the vertical displacement spatially generated is adjusted to as close to zero as possible by the spatial positional adjustment mechanically performed. The mechanical adjustment, however, unavoidably has a limited capacity, failing to finely adjust the displacement.

The invention accomplished a technical breakthrough to adjust the vertical displacement spatially generated to as close to zero as possible, wherein the displacement is temporally adjusted through timing adjustment.

The mechanical adjustment conventional performed adjusts the spatial positions of a target object and an imaging equipment relative to each other before an optical image of the target object is captured. This may be called "external adjustment". In contrast, the adjustment according to the invention is performed after an optical image of a target object is captured and electronically processed. This may be called "internal adjustment". The external adjustment is likely to generate inconsistency between a cause and a result, whereas the internal adjustment makes a cause and a result closely connected to each other, providing a radical solution.

When the spatial displacement between images is converted to the temporal displacement and adjusted, in other words, when the drive timing is adjusted, the vertical displacement is corrected between the left-eye image and the right-eye image constituting parallax images.

As described so far, the vertical shift between the optical axes of the left-eye image capturing unit 1L and the right-eye image capturing unit 1R, if generated, is reliably corrected, and parallax images obtained to be displayed and/or recorded have no spatially vertical displacement between the left-eye image and the right-eye image, thereby ensuring simultaneity of the images. As a result, a three-dimensional image obtained from these images has a good image quality. The invention provides a more sophisticated adjustment than the mechanically performed adjustment according to the prior art limited by the variability of mechanical devices.

Summarizing the technical matters described so far, a three-dimensional imaging device according to the invention includes:

an left-eye image capturing unit 1L for left eye having an image sensor 2L for left eye;

an right-eye image capturing unit 1R for right eye having an image sensor 2R for right eye;

a frame synchronizing drive controller 3 for driving the left-eye image sensor 2L and the right-eye image sensor 2R in a frame synchronizing manner;

a camera processor 4 for image-processing an image PL for left eye captured by the left-eye image capturing unit 1L and an image PR for right eye captured by the right-eye image capturing unit 1R to generate a parallax image of the left-eye image PL and the right-eye image PR; and a vertical timing adjuster 5 for adjusting timings of driving the left-eye image sensor 2L and the right-eye image sensor 2R using the frame synchronizing drive controller 3 to reduce as close to zero as possible an amount of vertical displacement between a framing position of a target object image in the left-eye image PL and a framing position of a target object image in the right-eye image PR.

<18> A three-dimensional imaging method according to the invention for the three-dimensional imaging device recited in <1> includes the following indispensable processing steps:

a first step for calculating an amount of vertical displacement between a framing position of a target object image in an image PL for left eye captured by a left-eye image capturing unit 1L having a left-eye image sensor 2L and a framing position of a target object image in an image PR for right eye captured by a right-eye image capturing unit 1R having a right-eye image sensor 2R;

a second step for adjusting timings of driving the left-eye image sensor 2L and the right-eye image sensor 2R based on a calculated amount of vertical displacement Δh; and a third step for serially reading per line image data after exposure to light is completed respectively obtained from the left-eye image sensor 2L and the right-eye image sensor 2R driven by the adjusted drive timings.

According to the three-dimensional imaging device and method recited in <1> and <18>, any vertical shift between optical axes of the pair of left and right image capturing units 1L and 1R is reliably corrected through the timing adjustment electronically performed by the vertical timing adjuster 5, and parallax images obtained to be displayed and/or recorded have no spatially vertical displacement between the left-eye image and the right-eye image, thereby ensuring simultaneity of the images. As a result, a three-dimensional image obtained from these images has a good image quality.

Effect of the Invention

According to the invention, a vertical shift, if generated between optical axes of a pair of left and right image capturing units, can be reliably corrected, and parallax images obtained to be displayed and/or recorded have no spatially vertical displacement between the left-eye image and the right-eye image, thereby ensuring simultaneity of the images. As a result, a three-dimensional image obtained from these images has a good image quality. Irrespective of any mechanical variability of the pair of left and right image capturing units of the same spec, parallax images obtained through timing adjustment electronically performed by a vertical timing adjuster to be displayed and/or recorded have no spatially vertical displacement between the left-eye image and the right-eye, thereby ensuring simultaneity of the images, and a three-dimensional image obtained from these images have a good image quality.

BRIEF DESCRIPTION OF THE DRAWINGS

FIG. 1 is a block diagram illustrating basic structural characteristics of a three-dimensional imaging device according to the invention.

FIG. 3 is a conceptual view 2 of the read timing adjustment in the rolling shutter according to the invention.

FIG. 5 is a conceptual view of exposure and readout in a conventional rolling shutter is used.

FIG. 6 is a block diagram illustrating basic structural characteristics of a three-dimensional imaging device according to an example of the invention.

MODE FOR CARRYING OUT THE INVENTION

The three-dimensional imaging device recited in <1>, and the three-dimensional imaging method recited in <18> for the device are more technically advantageous according to exemplary embodiments hereinafter described.

<2> The description of <1> referred to the trimming areas TL and TR. The trimming areas TL and TR are used to calculate an amount of delay necessary for the drive timing. Though the amount of delay of the drive timing may be differently calculated, the calculation of the amount of delay is facilitated by setting the trimming areas TL and TR.

Preferably, the vertical timing adjuster 5 calculates an amount of displacement between the left and right trimming areas TL and TR positionally set so that the relative positions of the same object at a time point in the left-eye image PL and the right-eye image PR are consistent with each other and sets an amount of delay of the drive timing corresponding to the calculated amount of displacement in the frame synchronizing drive controller 3.

When an image displaced vertically downward is trimmed, for example, image data for number of lines corresponding to the vertical displacement from its top may be rendered ineffective.

Figure 2:
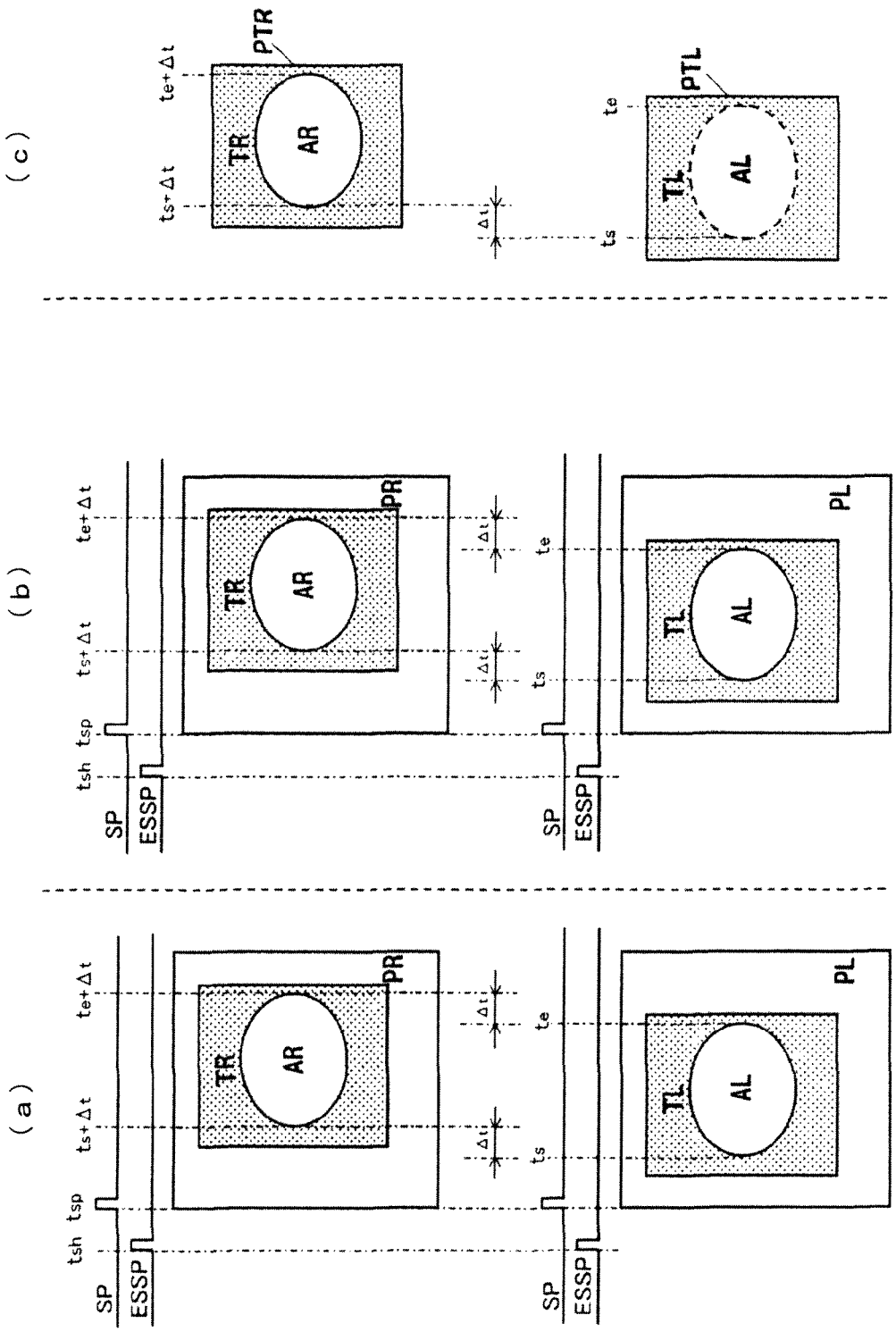
FIG. 2 is a conceptual view 1 of a read timing adjustment in a rolling shutter according to the invention.

<3> An electronic shutter to be provided in the image sensor is discussed below. The pair of left and right image capturing units 1L and 1R are respectively equipped with electronic shutters for controlling exposure. An MOS (Metal Oxide Semiconductor) image sensor is conventionally equipped with a rolling shutter, and a CCD (Charge Coupled Device) image sensor is conventionally equipped with a global shutter. The global shutter of the CCD image sensor is clicked for all of pixels at the same time. Therefore, when the left and right image sensors are synchronously driven, there is no timing delay even if any vertical displacement is generated between images for left eye and right eye as far as the images for left eye and right eye are equally trimmed. It is the rolling shutter of the MOS image sensor that may be technically problematic because the rolling shutter is configured for per-line read. FIGS. 2 and 3 (FIG. 5 too) are illustrations when the rolling shutter is used. The invention exerts its technical significance particularly when such rolling-shutter MOS image sensors are used as the left-eye and right eye image sensors 1L and 1R.

Summarizing the description given so far, in the three-dimensional imaging devices recited in <1> and <2>, the left-eye image sensor 2L and the right-eye image sensor 2R are preferably MOS image sensors each having a rolling shutter for exposure control.

The invention recited in <1> is originally designed for the rolling-shutter MOS image sensor. However, the invention recited in <1>, as well as the invention recited in <2>, is not necessarily applied to the rolling shutter which is an electronic shutter for exposure control. The invention recited in <1> and the invention recited in <2> are applicable to shutters of other types. On the other hand, the invention recited in <3> restricts the applicability. The MOS image sensor equipped with the rolling shutter configured for per-line read is suitable for the timing adjustment of the readout-start pulse SP outputted from the image sensor 2L, 2R by the vertical timing adjuster 5. This invention is suitably applied to the image sensor equipped with the rolling shutter thus characterized.

<4> In the three-dimensional imaging devices recited in <1> to <3>, preferably, the drive timing adjusted by the vertical timing adjuster 5 is a timing of a vertical synchronizing signal, and the vertical timing adjuster 5 delays the timing of the vertical synchronizing signal in one of the image sensors capturing the image where the framing position of the target object image is relatively upward (optical axis shifted downward) from a timing of a reference synchronizing signal by a vertical scan period comparable to number of lines corresponding to the vertical displacement. In one of the image sensors where the framing position of the target object image in the captured image is relatively downward, the timing of the vertical synchronizing signal is equal to the timing of the reference synchronizing signal. Therefore, the timing of the vertical synchronizing signal in the other image sensor where the framing position of the target object image in the captured image is relatively upward (optical axis shifted downward) is delayed by the vertical scan period corresponding to the vertical displacement from the timing of the vertical synchronizing signal in the image sensor where the framing position of the target object image is relatively downward (optical axis shifted upward).

The image sensor 2L of the left-eye image capturing unit 1L and the image sensor 2R of the right-eye image capturing unit 1R are both driven based on the respective vertical synchronizing signals used as timing reference signals. Therefore, the vertical synchronizing signals of these image sensors are independently timing-adjusted separately from each other. A basic signal of these vertical synchronizing signals of the image sensors 2L and 2R is the reference synchronizing signal. The timing of the vertical synchronizing signal of the image sensor where the framing position of the target object image is relatively downward (optical axis shifted upward) is set to be equal to the reference synchronizing signal, whereas the timing of the vertical synchronizing signal of the image sensor where the framing position of the target object image is relatively upward (optical axis shifted downward) is delayed from the reference synchronizing signal. An amount of delay $\Delta t$ at the time is equal to the vertical scan period comparable to number of lines corresponding to a vertical displacement $\Delta h$ between the framing positions of the target object images AL and AR in the left-eye image PL and the right-eye image PR. The amount of delay $\Delta t$ represents a time length, while the vertical displacement $\Delta h$ represents a physical length. The amount of delay $\Delta t$ may be converted to number of lines in a set display mode (resolution standard such as VGA).

Thus controlled, the vertical displacement, if generated between the framing positions of the target object images AL and AR in the left-eye image PL and the right-eye image PR, is adjusted as close to zero as possible, so that the left-eye and right-eye images constituting parallax images (trimming images PTL and PTR) are consistent with each other with no vertical displacement therebetween.

When the framing position of the target object image AL in the left-eye image PL is displaced relatively upward as illustrated in FIGS. 2 and 3, a readout-start timing is delayed in the left-eye image sensor 2L where the framing position of the target object image in the captured image is relatively upward (optical axis shifted downward). This eliminates the vertical displacement between the left-eye and right-eye images constituting parallax images, thereby spatially and temporally adjusting the relative position of the left-eye target object image AL to the relative position of the right-eye target object image AR.

Supposing that the right-eye image PR is displaced relatively upward, on the other hand, the readout-start timing is delayed in the right-eye image sensor 2R where the framing position of the target object image in the captured image is relatively upward. This eliminates the vertical displacement between the left-eye and right-eye images constituting parallax images, thereby spatially and temporally adjusting the relative position of the right-eye target object image AR to the relative position of the left-eye target object image AL.

In either case, the relative positions of the right-eye target object image AR and the left-eye target object image AL are spatially and temporally adjusted to be consistent with each other in the left-eye and right-eye images constituting the parallax images (trimming images PTL and PTR).

The spatial displacement between images is converted to the temporal displacement and then adjusted, which is to delay the readout-start timing. This means that the vertical timing adjuster 5 independently adjusts the timings of the vertical synchronizing signals of the left eye image sensor 2L and the right-eye image sensor 2R separately from each other.

<5> In the three-dimensional imaging devices recited in <3> and <4>, as to the drive timing of the left-eye MOS image sensor 2L, the right-eye MOS image sensor 2R, a timing of an electronic shutter start pulse ESSP (shutter gate pulse) and the timing of the readout-start pulse SP are delayed simultaneously by an amount of delay equal to the delay of the vertical synchronizing signal of the MOS image sensor.

When the electronic shutter start pulse ESSP is outputted, charge storage is serially reset per line every time when the optical image of the object is inputted in response to the pulse output, and an exposure period (storage time) starts by a timing of cancelling the pulse. The per-line read starts in response to the readout-start pulse SP, and one frame period (one field period) is defined based on a cycle of read.

A period from a timing of clearing the electronic shutter start pulse ESSP to a timing of outputting the next readout-start pulse SP is an exposure period. The electronic shutter start pulse ESSP and the readout-start pulse SP thus characterized are generated based on the vertical synchronizing signal. Therefore, when the vertical synchronizing signal is delayed, the electronic shutter start pulse ESSP and the readout-start pulse SP should be delayed equally to the delay of the vertical synchronizing signal.

<6> In the three-dimensional imaging devices recited in <1> to <5>, the vertical timing adjuster 5 converts the vertical displacement $\Delta h$ to an amount of number-of-line displacement and sets the amount of number-of-line displacement as the amount of delay of the drive timing in one of the left-eye image sensor 2L and the right-image image sensor 2R which captures the left-eye image PL or the right-eye image PR where the framing position of the target object image is upward relative to the framing position in the other. The amount of vertical displacement is known from on number of pixels in the vertical direction. The drive timing of the image sensor is adjusted based on number of lines. Depending on which of display mode (resolution standard) is chosen, for example, Full#HD (1920×1080), VGA (640×480), or QVGA (320×240), number of lines to be delayed is also changed. Therefore, the amount of vertical displacement should be converted to number of lines depending on the resolution standard.

Then, feedback of the number-of-line displacement (delay information) converted from the vertical displacement is transmitted to the targeted image sensor and used for matching control.

<7> In the three-dimensional imaging devices recited in <1> to <6>, it is necessary to transmit the amount of delay $\Delta t$ of the drive timing corresponding to the amount of displacement so that the targeted image sensor is instructed to adjust the drive timing by the vertical timing controller 5 by way of the frame synchronization drive controller 3. Therefore, the vertical timing controller 5 is further functioned to transmit the amount of delay $\Delta t$ of the drive timing, wherein the amount of delay $\Delta t$ of the drive timing is transmitted through a manual operation (by an operator of the three-dimensional imaging device).

<8> In place of the manual operation recited in <7>, the amount of delay $\Delta t$ of the drive timing is transmitted as an automatic feedback.

<9> Thus, there are two options; manual and automatic, to detect the vertical displacement, calculate the amount of vertical displacement $\Delta h$, and request the vertical matching. The manual operation is hereinafter discussed.

The left-eye image PL and the right-eye image PR are displayed on a monitor. These images displayed on the monitor may be original image data or image data resized or trimmed before being displayed. While these images are displayed, the operator checks whether the left-eye target object image AL and the right-eye target object image AR are vertically displaced relative to each other and the amount of vertical displacement $\Delta h$ when known that the images are displaced. Then, the operator manually operates an operation unit 6 (see FIG. 1) to generate a displacement adjustment command signal to positionally adjust the trimming area in one of the images captured by the image sensors so that the displacement is reduced as close to zero as possible. Further, the operator transmits the displacement adjustment command signal to a position adjuster provided (in the camera processor) to adjust the trimming area of the image. The ongoing reduction of the displacement of the trimming image is displayed on the monitor. While conforming the displayed images, the operator continues the adjustment until the vertical displacement becomes zero. The displacement adjustment command signal at a time point when the images are positionally aligned in the vertical direction by changing the trimming position is transmitted to the vertical timing adjuster 5 to adjust the readout-start timing. Then, the readout-start timing starts to be adjusted.

As a result of the adjustment, the amount of vertical displacement is reduced between the left-eye trimming area TL including the left-eye target object image AL and the right-eye trimming area TR including the right-eye target object image AR. The ongoing reduction of the displacement of the vertical displacement is displayed on the monitor. Finally, the amount of vertical displacement Δh between the left-eye trimming area TL and the right-eye trimming area TR becomes zero. As a result of the adjustment, parallax images obtained to be displayed and/or recorded have no spatially vertical displacement between the left-eye image and the right-eye image, thereby ensuring simultaneity of the images, and a three-dimensional image obtained from these images has a good image quality.

Summarizing the description given so far, the three-dimensional imaging devices recited in <1> to <7> further include an operation unit for generating a displacement adjustment command signal to instruct the vertical timing generator 5 to adjust the drive timing through a manual operation by the operator of the three-dimensional imaging device, wherein the vertical timing adjuster 5 adjusts the drive timing using the frame synchronizing drive controller 3 based on the displacement adjustment command signal.

According to the device thus characterized, parallax images obtained to be displayed and/or recorded through the manual operation while checking the displayed images have no spatially vertical displacement between the left-eye image and the right-eye image, thereby ensuring simultaneity of the images, and a three-dimensional image thereby obtained has a good image quality.

<10> The manual adjustment uses a function of the camera processor 4. The camera processor 4 is functioned to reduce the image data for the left and right trimming areas TL and TR into a monitor size and display the reduced images on left and right sides of the monitor (see FIG. 11). This function is to detect the displacement through visual sensation.

The image data for the left and right trimming areas TL and TR are reduced so that the left and right two images respectively horizontally in half sizes are displayed on the monitor. The reduced image of the right-eye trimming image PTR is displayed on the right side of the monitor, while the reduced image of the left-eye trimming image PTL is displayed on the left side of the monitor. With any shift between the optical axes of the pair of left and right image capturing units 1L and 1R, the two images displayed on the left and right sides of the monitor have a vertical displacement therebetween. The operator, while confirming the two images vertically displaced relative to each other on the monitor, cancels the vertical displacement between the left-eye image and the right-eye image by manually operating the operation unit 6.

During the manual adjustment by using the displacement detecting function, positions of starting lines of the trimming areas are vertically adjusted to ensure horizontal continuity of the same target object in the images. In an imaging operation performed outdoors, a distant landscape, for example, is adjusted based on a horizontal line. The amount of delay Δt of the drive timing corresponding to the displacement thus obtained is internally obtained and reflected as the amount of delay Δt of the drive timing in the vertical timing adjuster 5. The positional alignment of the left-eye and right eye display images in the vertical direction is to adjust positions of the starting lines of the trimming areas in the vertical direction.

<11> In the three-dimensional imaging device recited in <10>, the left-eye trimming image PTL and the right-eye trimming image PTR are respectively displayed in half sizes. The camera processor 4 is functioned to reduce to half the left-side image obtained from the image data of the left-eye trimming area TL and display the reduced image on the left side of the monitor, while reducing to half the right-side image obtained from the image data of the right-eye trimming area TR and displays the reduced image on the right side of the monitor (see FIG. 12). This function is also to detect the displacement through visual sensation When the half image in the display area on left and the half image on the display area on right are combined, a complete pattern is obtained. With any shift between the optical axes of the pair of left and right image capturing units 1L and 1R, the two images displayed on the left and right display areas have a vertical displacement in a boundary therebetween (longitudinally center line). The operator, while confirming the two half images vertically displaced relative to each other on the monitor, cancels the vertical displacement between the left-eye image and the right-eye image by manually operating the operation unit 6.

During the manual adjustment by using the displacement detecting function, the operator, while confirming a balanced continuity in the boundary between the target object images separated to left and right on the boundary (longitudinally center line), adjusts positions of the starting lines of the trimming areas in the vertical direction. In the case where, for example, a whole body of the target object image is split in a left-side body part and a right-side body part, and some parts of the left-side body part and the right-side body part are misaligned in the vertical direction. It is relatively easy for the operator to precisely align the left and right sides of the body manually because he only needs to take the left-right balance of the body including his/her face. The amount of delay Δt of the drive timing corresponding to the displacement thus obtained is internally obtained and reflected as the amount of delay Δt of the drive timing in the vertical timing adjuster 5. The positional alignment of the left-eye and right eye display images in the vertical direction is to adjust positions of the starting lines of the trimming areas in the vertical direction.

<12>, <13>

In the three-dimensional imaging devices recited in <10> and <11>, the vertical timing adjuster 5 uses, as the amount of delay Δt of the drive timing, an amount of delay calculated when a differential between positional information of the starting line of the left-eye trimming area TL and positional information of the starting line of the right-eye trimming area TR is obtained and converted to time. The amount of vertical displacement is corrected based on the positions of the starting lines of the left and right trimming areas.

Figure 4:
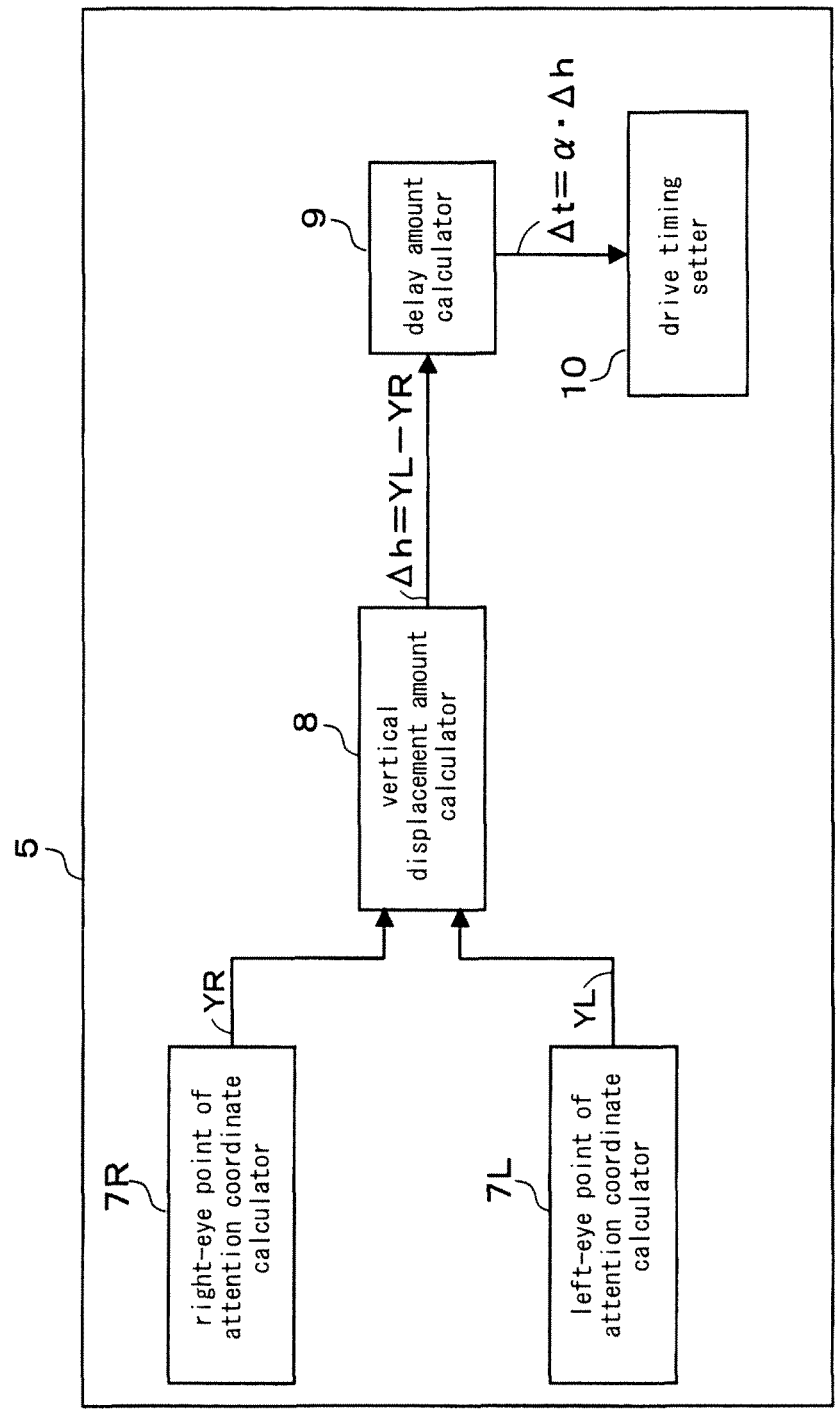
FIG. 4 is a block diagram illustrating basic structural characteristics of a vertical timing adjuster according to an exemplary embodiment of the invention.

<14> It is automatically performed to detect the vertical displacement, calculate the amount of vertical displacement Δh, and request the vertical matching. Describing the automatic operation referring to FIG. 4, the vertical timing adjuster 5 includes a point-of-attention coordinate calculator 7L for left eye, a point-of-attention coordinate calculator 7R for right eye, a vertical displacement amount calculator 8, a delay amount calculator 9, and a drive timing setter 10.

The left-eye point of attention coordinate calculator 7L obtains a vertical coordinate YL of a point of attention QL (for example, eye or mouth in a face) of the target object image AL in the left-eye image PL. The right-eye point of attention coordinate calculator 7R obtains a vertical coordinate YR of a point of attention QR of the target object image AL in the right-eye image PR.

The amount of vertical displacement $\Delta h$ is obtained from (YL−YR) ($\Delta h$=YL−YR). The vertical displacement amount calculator 8 calculates the amount of vertical displacement $\Delta h$ from a differential between the vertical coordinates YL and YR of the points of attention QL and QR. With $\Delta h>0$, the target object image AL in the left-eye image PL is displayed vertically downward relative to the target object image AR in the right-eye image PR. With $\Delta h<0$, the target object image AR in the right-eye image PR is displayed vertically downward relative to the target object image AL in the left-eye image PL.

The left-hand side and the right-hand side of the formula may be reversed ($\Delta h$=YR−YL). The amount of vertical displacement $\Delta h$ expressed by number of pixels is equal to number of lines. A differential between numbers of lines (numbers of pixels) in the vertical direction is comparable to a time of delay of the drive timing. Therefore, the amount of delay $\Delta t$ of the drive timing can be calculated from the amount of vertical displacement $\Delta h$. The delay amount calculator 9 converts the amount of vertical displacement $\Delta h$ to the time-based amount of delay $\Delta t$ of the drive timing. $\Delta t = \alpha \cdot \Delta h$ ($=\alpha \cdot$(YL−YR), where a is a coefficient. When the amount of delay $\Delta t$ shows a positive value, the drive timing for the right-eye image PR is delayed. When the amount of delay $\Delta t$ shows a negative value, the drive timing for the left-eye image PL is delayed. The drive timing setter 10 sets the drive timing plus the amount of delay $\Delta t$ in the frame synchronizing drive controller 3.

Summarizing the description given so far, in the three-dimensional imaging devices recited in <1> to <12>, the vertical timing adjuster 5 includes:

a point-of-attention coordinate calculator 7L for left eye and a point-of-attention coordinate calculator 7R for right eye respectively for extracting a left-side point of attention QL in the left-eye image PL and a right-side point of attention QR in the right-eye image PR and calculating vertical coordinates of the left-side point of attention QL and the right-side point of attention QR;

a vertical displacement amount calculator 8 for calculating the amount of vertical displacement from a differential between a vertical coordinate YL of the left-side point of attention QL and a vertical coordinate YR of the right-side point of attention QR;

a delay amount calculator 9 for converting the amount of vertical displacement $\Delta h$ to the amount of delay $\Delta t$ of the drive timing based on time; and a drive timing setter 10 for setting the drive timing plus the amount of delay $\Delta t$ in the frame synchronizing drive controller 3.

<19> A three-dimensional imaging method for the three-dimensional imaging device recited in <13> is provided by further adding processing steps to the three-dimensional imaging method recited in <18>. According to the three-dimensional imaging method, the first step includes:

a step 1-1 for displaying the left-eye image PL and the right-eye image PR side by side on a screen;

a step 1-2 for positionally setting the trimming areas TL and TR so that relative positions of the same object at a time point in the left-eye image PL and the right-eye image PR are consistent with each other;

a step 1-3 for extracting points of attention QL and QR from the trimming areas TL and TR of the left-eye and right-eye images; and a step 1-4 for detecting the amount of vertical displacement $\Delta h$ between the point of attention QL in the left-eye image PL and the point of attention QR in the right-eye image PR.

According to the three-dimensional imaging device and method respectively recited in <14> and <19>, any shift between the optical axes of the pair of left and right image capturing units 1L and 1R is reliably corrected through the timing adjustment electronically processed and automatically performed by the vertical timing adjuster 5 based on feedback of the amount of delay $\Delta t$ corresponding to the amount of vertical displacement $\Delta h$ to the drive timing. Therefore, parallax images obtained to be displayed and/or recorded have no spatially vertical displacement between the left-eye image and the right-eye image, thereby ensuring simultaneity of the images. As a result, a three-dimensional image obtained from these images has a good image quality.

<20> In the three-dimensional imaging method recited in <19>, the step 1-4 detects the amount of vertical displacement $\Delta h$ by detecting an amount of positional shift when one of the trimming area TL of the left-eye image QL and the trimming area TR of the right-eye image QR is positionally shifted in the vertical direction so that the trimming areas are positionally consistent with each other.

<21> In the three-dimensional imaging method recited in <19>, the step 1-4 calculates a differential between a line number of a line where the point of attention QL in the trimming area TL of the left-eye image PL belongs and a line number of a line where the point of attention QR in the trimming area TR of the right-eye image PR belongs to detect the amount of vertical displacement $\Delta h$.

<15> The three-dimensional imaging device respectively recited in <14> further preferably includes a face region detector for detecting a face region of the target object in each of the left-eye image QL and the right-eye image PR, wherein the point of attention coordinate calculators 7L and 7R respectively set particular sites of the face regions detected by the face region detector in the left-side point of attention QL and the right-side point of attention PR.

<22> In the three-dimensional imaging methods respectively recited in <19> to <21>, particular sites of the face regions of the target object in the left-eye and right-eye images are used as the points of attention.

<16> Very often, a zoom lens having a variable power is used in the left-eye, right-eye image capturing unit 1L, 1R. The variable-power zoom lenses, when respectively provided in the left-eye image capturing unit 1R and the right-eye image capturing unit 1L, operate in tandem with each other. In the event of an error between the magnifying powers on left and right sides, mismatching occurs between the left-eye and right-eye images whether the error causes a shift to the telescopic side or wide angle side, failing to provide a suitable three-dimensional image. A telescopic zoom lens, if used as the variable power lens, worsens the mismatching between the left-eye and right-eye images.

In view of the described inconvenience, it provides a great significance to apply the technical aspects of <1> to a three-dimensional imaging device wherein the left-eye and right-eye image capturing units 1L and 1R are equipped with the variable power lenses.

Summarizing the description given so far, in the three-dimensional imaging devices recited in <1> to <16>, the left-eye image capturing unit 1L and the right-eye image capturing unit 1R each has an optical system including a variable power lens, wherein the variable power lens of the left-eye image capturing unit 1L and the variable power lens of the right-eye image capturing unit 1R operate in tandem with each other.

The variable power lenses conventionally available are mostly designed to reciprocate along an optical axis. The variable power lens used in the device in this section is not necessarily limited thereto. The magnifying power of the lens may be variable in any manner but through reciprocation.

<17> In the three-dimensional imaging device recited in <16>, the amount of vertical displacement Δh between two images changes with any changes of zoom ratios of the variable power lenses of the two image capturing units. This section provides a solution for adjusting the displacement change. The largest telescopic magnifying power for an image on the most wide angle side is called n, the number of displacement lines on the most wide angle side is called Lw, and the number of displacement lines on the most telescopic side is called Lt. The number of displacement lines with an arbitrary magnifying power b is $Lb=[(Lt-Lw)/\sqrt{n}]\times\sqrt{b}+Lw$, where $\sqrt{n}$ is an amount of change per side for n times, $\sqrt{b}$ is an amount of change per side for magnifying power b. This represents the number of displacement lines for the magnifying power b ($\sqrt{}$ denotes the square root of n). The amount of delay Δt of the drive timing is further calculated based on the number of displacement lines for feedback.

The number of lines representing the amount of vertical displacement in the imaging area on the most wide angle side and the number of lines representing the amount of vertical displacement in the imaging area on the most telescopic side are each registered and converted to the number of lines at the position of an arbitrary magnifying power. Accordingly, irrespective of the zoom ratio variability of the variable power lenses, the parallax images obtained to be displayed and/or recorded have no spatially vertical displacement between the left-eye image and the right-eye image to ensure simultaneity, and a three-dimensional image thereby obtained has a good image quality.

<23> The three-dimensional imaging method is more specifically defined. The three-dimensional imaging method preferably further includes:

a fourth step for starting to capture the left eye image PL and the right-eye image PR;

a fifth step for reading the left eye image PL and the right-eye image PR;

a sixth step for initially setting the trimming areas TL and TR in the left eye image PL and the right-eye image PR;

a seventh step for extracting the point of attention QL and the point of attention QR respectively in the trimming areas TL and TR of the left-eye image PL and the right-eye image PR;

an eighth step for confirming whether the vertical displacement is present between the point of attention QL in the left-eye image PL and the point of attention QR in the right-eye image PR;

a ninth step for positionally adjusting vertically one of the trimming area TL of the left-eye image PL and the trimming area TR of the right-eye image PR when the presence of the vertical displacement is confirmed;

a 10th step for repeating the seventh to ninth steps until the amount of vertical displacement Δh finally reaches zero; and an 11th step for storing an amount of vertical adjustment in one of the trimming areas positionally adjusted in the ninth step when the amount of vertical displacement Δh is finally zero as the amount of delay of the drive timing corresponding to the amount of vertical displacement Δh detected in the eighth step.

<24> The three-dimensional imaging device recited in <23> further includes:

a 12th step for determining whether electronic shutters of the left-eye image sensor 2L and the right-eye image sensor 2R are rolling shutters; and a 13th step for setting the amount of delay of the drive timing corresponding to the amount of vertical displacement Δh in the left-eye image sensor 2L or the right-eye image sensor 2R determined in 12th step as having the rolling shutter as the electronic shutter.

Hereinafter, basic technical characteristics of the rolling shutter are described for reference (†1). The description given below is reflected on <1> of Means for Solving the Problems.

Referring to FIG. 5, a) illustrates time transition, and b) illustrates an image captured by an image sensor, and c) illustrates exposure and readout control. a), b), and c) are temporally consistent vertically. In a) of FIG. 5, time advances to right, ESSP is an electronic shutter start pulse, and SP is a readout-start pulse. In b) of FIG. 5 illustrating the image captured by the image sensor, P is the captured image, A is a target object to be read, a vertical direction on the drawing is a horizontal direction of the captured image (direction along lines), and a lateral direction on the drawing is a vertical direction of the captured image. A reed shape represents image data per line. In c) of FIG. 5, a lateral direction is time axis, and a vertical direction is a vertical direction of an imaging screen. A reed shape may represent an imaging progress (time transition) per line (see "Introduction to Technology of CCD/CMOS Camera", Masuo Takemura, Corona Publishing Company, 3.19 Principle of Shutter System, b) How to Read from CMOS (rolling shutter)). The illustration of c) of FIG. 5 may be an upper view of the illustration of c) of FIG. 5.

When the electronic shutter start pulse ESSP is outputted, charge storage is serially reset per line every time when the target object image is inputted, and an exposure period (storage time) starts by a timing of cancelling the pulse. The output of readout-start pulse SP serves as a trigger to start to serially read image data per line, and one frame period (one field period) is defined based on a cycle of read.

The electronic shutter start pulse ESSP and the readout-start pulse SP are outputted for a first line exposure and per-line data read. Though not illustrated in the drawing, the electronic shutter start pulse ESSP and the readout-start pulse SP are similarly used in pair by each line and outputted in a time-shifted manner by an amount of time comparable to one line. A period from a pulse clearing timing tsh of the electronic shutter start pulse ESSP to an output timing tsp of the next readout-start pulse SP is an exposure period Tex. A long parallelogram representing a range of Tex ("exposure period per line" in c)) expresses a common exposure period in all of the lines. The exposure period Tex can be equally set for all of the lines.

A group of pixels in each line are exposed to light during the exposure period Tex, and image data is read per line serially from the first line to the last line in response to the readout-start pulse SP immediately after the exposure period Tex is over while the charges generated by photoelectric conversion are continuously stored at the same time. This is the exposure and readout by the rolling shutter of the MOS image sensor.

Of a target object image A constituting an image, different parts are often temporally shifted vertically. A leg part of the target object image A is obtained by a timing slightly later than a head part because the timings of starting exposure, ending exposure, and starting readout are delayed serially from the head part to the leg part of the target object image A.

The electronic shutter start pulse ESSP and the readout-start pulse SP thus characterized are generated based on a vertical synchronizing signal. In the event of any delay of the vertical synchronizing signal, therefore, the electronic shutter start pulse ESSP and the readout-start pulse SP are correspondingly delayed by an equal delay time.

Hereinafter, an example of the three-dimensional imaging device and the three-dimensional imaging device according to the invention is described in detail referring to the drawings. FIG. 6 is a block diagram illustrating basic structural characteristics of a three-dimensional imaging device according to the example. Referring to reference numerals illustrated in FIG. 6, 100 is a three-dimensional imaging device, and 200 is a camera processor. The three-dimensional imaging device 100 and the camera processor 200 are electrically connected to each other through a data communication device 150 including cables. The three-dimensional imaging device 100 has a right-eye image capturing unit 1R, a left-eye image capturing unit 1L, and a frame synchronization drive controller 3 which is a dual sensor.

The right-eye image capturing unit 1R has a variable power lens 11, an optical lens 12, an optical low-pas filter (LPF) 13, a color filter 14, an MOS image sensor 2R, and an analog front-end unit 15 including an AD converter. Similarly, the left-eye image capturing unit 1L has a variable power lens 21, an optical lens 22, an optical low-pas filter (LPF) 23, a color filter 24, an MOS image sensor 2L, and an analog front-end unit 25 including an AD converter. The frame synchronization drive controller 3 drives the left and right image sensors 2L and 2R in a frame synchronizing manner. The left and right image sensors 2L and 2R are MOS image sensors each having a rolling shutter mechanism.

The left-eye image sensor 2L and the right-eye image sensor 2R independently transmits therethrough light flux of a target object to be imaged and outputs object image data obtained by photoelectric conversion in the image sensors 2L and 2R to the camera processor 200 as parallax image data.

The left-eye image sensor 2L and the right-eye image sensor 2R are similarly structured and operated. Describing the right-eye image sensor 2R, light transmitted through the variable power lens 11 and the optical lens 12 driven along an optical axis passes through the optical LPF 13 and the color filter 14 and enters the image sensor 2R. The optical LPF 12 removes a high-frequency component from the incident light and then performs an anti-aliasing process. The target object image formed on a receiving surface of the image sensor 2R is converted to signal charges corresponding to an amount of the incident light by photo diodes and read serially as a voltage signal (image signal) according to the signal charges. The image signal read from the image sensor 2R is transmitted to the analog front-end unit 15 and subjected to signal processes such as analog gain and CDS (correlated double sampling). Then, the processed image signal is converted into a digital signal by A/D conversion and outputted to a pre-processing unit 44 of the camera processor 200. The left-eye image capturing unit 1L functions similarly to the description.

The left-eye image sensor 2L and the right-eye image sensor 2R are driven based on pulses transmitted from a driver circuit of the frame synchronization drive controller 3. The driver circuit generates vertical synchronizing signals VL and VR respectively for the image sensors based on a reference synchronizing signal shared by the image sensors 2L and 2R. The driver circuit generates an electronic shutter start pulse ESSP (shutter gate pulse) and a readout-start pulse SP based on the vertical synchronizing signals VL and VR and thereby controls the image sensors 2L and 2R separately from each other. The charges stored in the photo diodes of the respective pixels are reset serially per line based on the electronic shutter start pulse ESSP. A period from a pulse clearing timing of the electronic shutter start pulse ESSP to an output timing of the next readout-start pulse SP is an exposure period (storage period). The readout-start pulse SP is outputted for the image sensors 2L and 2R per line, and the image data is correspondingly read per line. The image data obtained from the image sensors 2L and 2R are outputted as a left-eye image PL and a right-eye image PR.

The timings of the vertical synchronizing signals VL and VR for deciding timings of driving the image sensors 2L and 2R are controlled by the frame synchronization drive controller 3. An amount of delay $\Delta t$, which is a time difference between the timings of the vertical synchronizing signals VL and VR, is outputted from a CPU 41 of the camera processor 200 described later and inputted to the frame synchronization drive controller 3 by way of the pre-processing unit 44. The amount of delay $\Delta t$ is increased or decreased based on an integral multiple of a unit time of each line.

In one of the image sensors where the vertical synchronizing signal is delayed by the amount of delay $\Delta t$, the electronic shutter start pulse ESSP and the readout-start pulse SP are correspondingly delayed by the same amount of delay $\Delta t$. The electronic shutter start pulse ESSP and the readout-start pulse SP are periodically outputted from the frame synchronization drive controller 3 to the left-eye image sensor 2L and the right-eye image sensor 2R.

Next, the camera processor 200 is described. Describing structural elements of the camera processor 200, 41 is a CPU (Central Processing Unit), 42 is a ROM (Read Only Memory), 43 is a RAM (Random Access Memory), 44 is a pre-processing unit, 45 is a memory controller, 46 is an image memory, 47 is an image processing unit, 48 is a compressing/decompressing unit including detection of a motion vector, 49 is a resizing unit, 50 is a face region detecting unit, 51 is a recording medium interface, 52 is a display unit, 53 is a monitor interface, 54 is an operation panel, 55 is a recording medium, 56 is a hand shake detecting unit, 57 is a synchronizing signal generating unit (SSG), and 58 is an external device control interface.

The CPU 41 is a controller responsible for an overall operation of the device in accordance with a predefined program. The CPU 41 controls the operations of circuits constituting the structural elements based on operation signals outputted from the operation panel 54. The CPU 41 controls the left-eye image capturing unit 1L and the right-eye image capturing unit 1R under the control by the frame synchronization drive controller 3 in accordance with various imaging conditions (for example, exposure setting, strobe emission, imaging mode) in response to the outputted operation signals. The CPU 41 is further in charge of automatic exposure (AE) control, auto focus (AF) control, auto white balance control, lens drive control, image process control, and read-write control with respect to the recording medium 55. For example, the CPU 41 drives focus lenses of the optical lenses 12 and 22, and drives the variable power lenses 11 and 21 in response to a zoom instruction inputted from the operation panel 54 to equally set magnifying powers of the optical systems. The CPU 41, when detecting that a release switch is pressed half down, performs the AF control. When the release switch is pressed all way down, the CPU 41 starts to perform the exposure and readout control in a matching manner to fetch the images to be recorded. The CPU 41 transmits a command to a strobe control circuit not illustrated in the drawings whenever necessary to control light emission of a photoflash arc tube (light emitter) such as a xenon tube.

The ROM 42 stores therein various data necessary for programs and controls executed by the CPU 41, and the RAM 43 is used as a working area of the CPU 41.

The digital image signals obtained by A/D conversion in the analog front-end units 15 and 25 of the left-eye image capturing unit 1L and the right-eye image capturing unit 1R are transmitted to the image signal processing unit 47 by way of the pre-processing unit 44. The pre-processing unit 44 includes an auto computing unit which executes computing processes necessary for controlling AE and AF, wherein focus evaluation and AE are computed based on the image signal inputted when the release switch is pressed half down, and a computing result is transmitted to the CPU 41. When it is detected that the release switch is pressed all way down, the CPU 41 controls a lens-drive motor not illustrated in the drawings based on a computing result of the focus evaluation and moves the optical lenses 12 and 22 to such focus positions that matching succeeds. Further, the CPU 41 executes the exposure control such that matching succeeds in setting of the electronic shutter and diaphragm.

The pre-processing unit 44 and the image signal processing unit 47 execute various processes; simultaneity process (correcting spatial displacement between color signals because of a color filter array), white balance (WB) adjustment, gamma correction, generation of luminance and color difference signals, contour highlighting, magnifying power change using an electronic zoom function (enlargement/reduction), and conversion of number of pixels (resizing). These processes are executed in accordance with commands outputted from the CPU 14. Further, the pre-processing unit 44 and the image signal processing unit 47 process the image signals using the image memory 46 through the memory controller 45 provided between the pre-processing unit 44 and the image signal processing unit 47 and temporarily stores the resulting image data in the image memory 46.

The resizing unit 49 changes an image size of the image data subjected to the predefined signal processes by the pre-processing unit 44 and the image signal processing unit 47 to a standardized size. The image size is thus changed when the image data is recorded or displayed on a monitor display connected to the monitor interface 53 in standardized sizes. The face region detecting unit 50 detects information of the image data such as position, size, and tilt of a face whenever necessary.

The compressing/decompressing unit 48 compresses the resized image data in different compression formats, wherein a compression encoding algorithm suitable for the compression format is used. In the case of compressing the data in a standardized size in a moving image compression data format, for example, MPEG or H.264, the compressing/decompressing unit 48 periodically reads and fetches the resized image data in a concurrent process from the image memory 46 through the memory controller 45, and then compresses the fetched image data. Then, the compressing/decompressing unit 48 writes the compressed image data back in the image memory 46 so that the compressed data is stored in a memory space.

The recording medium interface 51 transfers the compressed image data to the recording medium 55 to be recorded therein through the memory controller 45 and the recording medium 55. The two different image data thus fetched from the left-eye image capturing unit 1L and the right-eye image capturing unit 1R are recorded in the recording medium 55 in accordance with a recording mode. The recording medium 55 is not necessarily limited to a semiconductor memory such as memory card, and other various media are usable, for example, magnetic disc, optical disc, and photomagnetic disc. The recording medium 55 may be a removable medium, however, may be an embedded recording medium (internal memory).

The operation panel 54 is used by an operator to input instructions to the camera system. The operation panel 54 includes a variety of operation devices such as a mode selection switch for selecting an operation mode of the camera system, an arrow key for selecting a menu item (moving cursor) and inputting instructions such as frame advance/frame rewind, an execution key for settling (registering) the selected menu item and instructing an operation to be executed, a cancel key for erasing any desirable target such as selected item and cancelling an instruction, a power switch, a zoom-in switch, a release switch, and a displacement correction device for correcting a vertical displacement.

Figure 7:
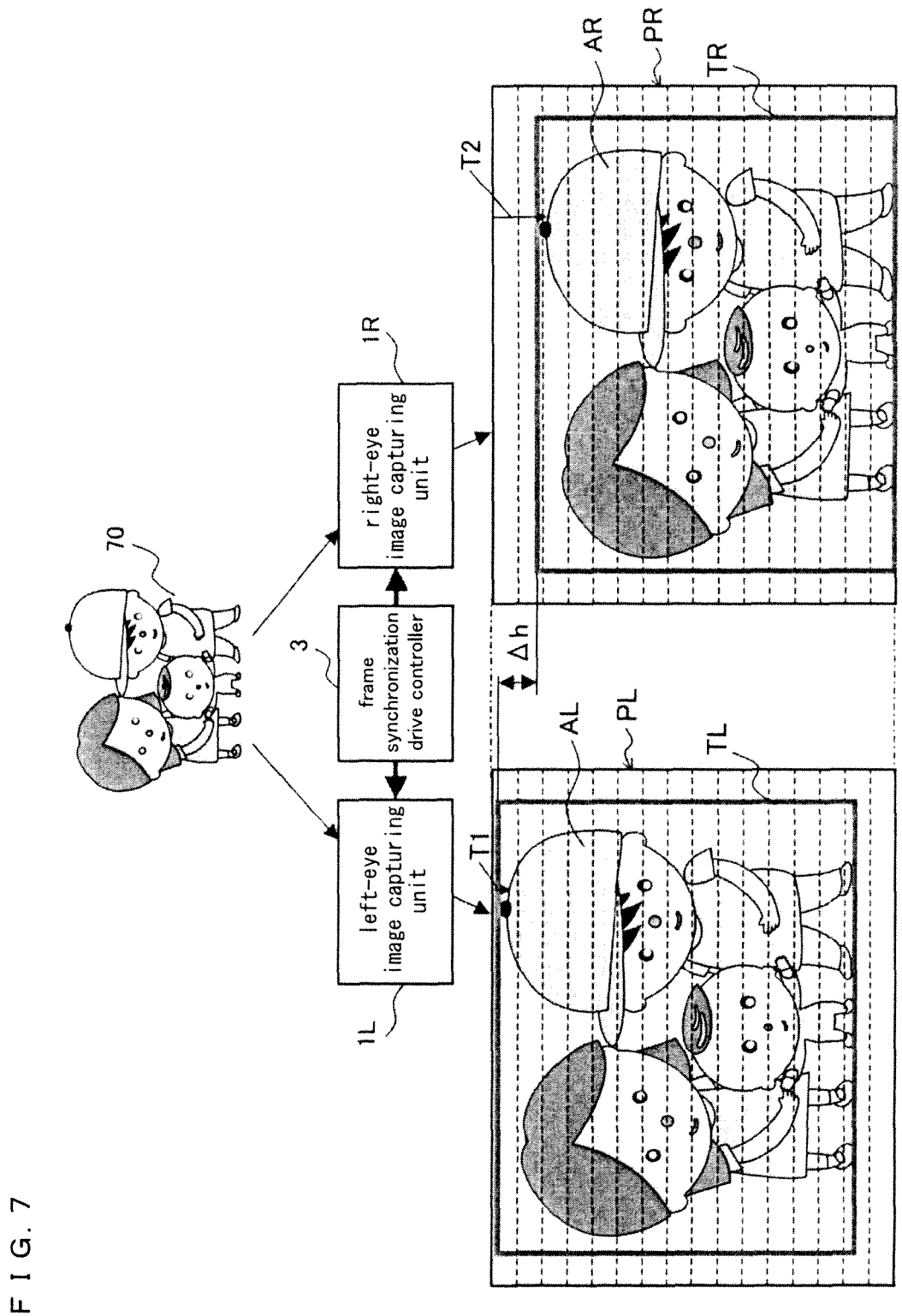
FIG. 7 is an illustration of a vertical displacement generated between images for left eye and right eye according to the example.

An operation of the three-dimensional imaging device according to the example thus characterized is hereinafter described. FIG. 7 is an illustration of a vertical displacement generated between images for left eye and right eye. When the left-eye image capturing unit 1L and the right-eye image capturing unit 1R synchronized by the frame synchronization drive controller 3 respectively capture images of a target object to be imaged 70, the left-eye image PL and the right-eye image PR are obtained. In the illustrated example, the left-eye image capturing unit 1L has an optical axis shifted relatively downward. Because of the optical axis of the left-eye image capturing unit 1L shifted downward relative to the right-eye image capturing unit 1R, a left-eye target object image AL is displaced upward relative to a right-eye target object image AR in framing. An amount of displacement caused by the shift of the optical axis is called $\Delta h$ in a vertical direction relative to a reference position on the receiving surface of the image sensor.

To measure the amount of vertical displacement $\Delta h$, a left-eye trimming area TL and a right-eye trimming area TR are respectively set as similar recording valid areas for the target object images AL and AR in the left-eye image PL and the right-eye image PR. The left and right trimming areas TL and TR are positionally set so that a relative position of the target object image AL in the left-eye trimming area TL and a relative position of the target object image AR in the right-eye trimming area TR are consistent with each other.

Figure 8:
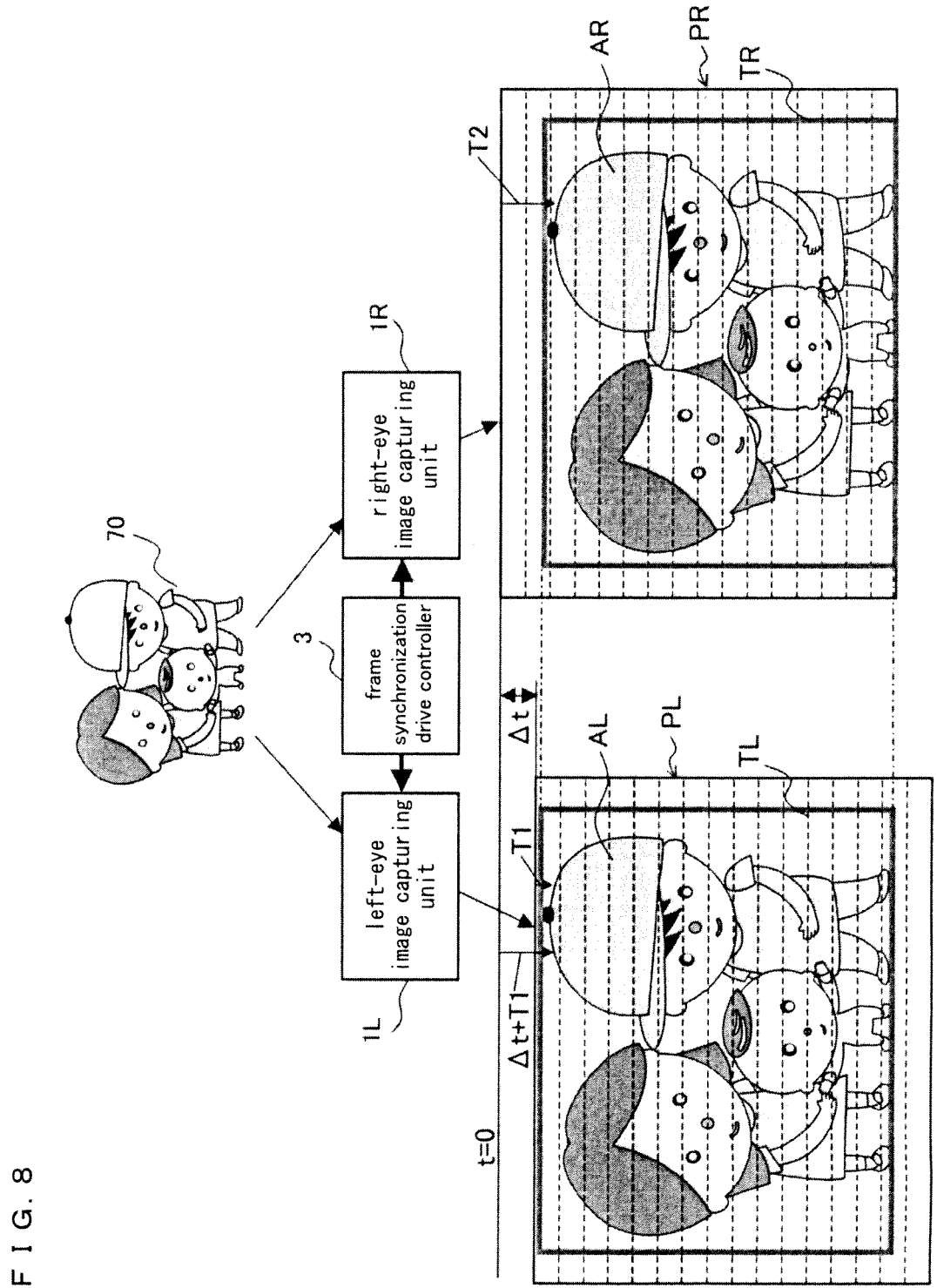
FIG. 8 is an illustration of a readout timing control for a vertical displacement according to the example.

FIG. 8 is an illustration of a readout timing control for the vertical displacement. The object of this example is to adjust the illustration of FIG. 7 to the illustration of FIG. 8. In one of the image sensors where the optical axis is shifted relatively downward and the target object image AL is thereby displaced relatively upward (left-eye image sensor 2L in the example), a readout-start timing is delayed from a reference timing. Measuring the amount of vertical displacement $\Delta t$ using number of lines, the amount of delay $\Delta t$ then is a value obtained by converting number of lines to time. The reference timing is used as the readout-start timing in the other imaging sensor (right-eye image sensor 2R in the given example).

The readout-start timing is delayed by delaying an output timing of the readout-start pulse SP. The output timing is delayed by delaying an output timing of the vertical synchronizing signal generated from the reference synchronizing signal in the frame synchronization drive controller 3. When the output timing of the vertical synchronizing signal is delayed, the output timings of the electronic shutter start pulse ESSP, readout-start pulse SP, and other timing pulses are correspondingly delayed by an amount of time equal to the delay.

Describing in further detail the adjustment from the illustration of FIG. 7 to the illustration of FIG. 8, a peak point of a father's cap in the left-eye target object image AL is read at a time point T1 shortly after a start line of the left-eye image PL (readout starting time), whereas a peak point of a father's cap in the right-eye target object image AR is read by a further delayed timing which is a time point T2 later than a start line of the right-eye image PR (readout starting time). A difference between the timings (T2−T1) represents the amount of delay Δt, Δt=T2−T1.

Focusing on the right-eye target object image AR illustrated in FIG. 8 where the target object image is not vertically displaced downward, the readout of the right-eye image PR including the right-eye target object image AR starts with the output of the readout-start pulse SP based on the reference vertical synchronizing signal, meaning that the readout of the right-eye image PR starts as scheduled without any delay. On the other hand, the readout of the left-eye image PL where the target object image is vertically displaced downward starts at a time point later by the amount of time Δt than the reference readout timing.

Referring to the drawing, a timing corresponding to a time point on an upper end side of the right-eye image PR is t=0, and the timing t=0 is extended horizontally to the left-eye image PL. The peak point of the father's cap in the right-eye target object image AR is read by a timing t=T2. A timing corresponding to a time point on an upper end side of the left-eye image PL is t=Δt. In the left-eye image PL, an amount of time between the timing corresponding to the time point on the upper end side and the timing corresponding to the time point of the peak point of the father's cap is T1. Therefore, the readout timing of the peak point of the father's cap in the left-eye image PL is (Δt+T1) with the timing=0 as a starting point. It is calculated from the formula (Δt=T2−T1) that Δt+T1=T2, which is equal to the readout timing T2 of the peak point of the father's cap in the right-eye image PR.

When the peak points of the father caps in the left-eye image PL and the right-eye image PR are read by an equal timing, all of the other parts of the fathers and all of parts of mothers and children in the left-eye image PL and the right-eye image PR are read by an equal timing.

For example, a moving object moving at a relatively high speed is imaged in place of the still object illustrated in the illustrated example. More specifically, when the father suddenly sits down in the illustration of FIG. 7, the peak point of the to father's cap is displaced further downward in the right-eye image PR where the readout timing is delayed. Supposing that a degree of the displacement converted to time is tα, T2 in the still object is now expressed as T2'=T2+Δtα. Along with the transition, an amount of delay Δt' changes as Δt'=Δt+Δtα from Δt in the still object image. Then, assigning (Δt=T2−T1) to these formulas and replacing Δt with t', Δt'+T1=Δt+Δtα+T1=Δt+(T2'−T2)+T1=(T2−T1)+(T2'−T2)+T1=T2' is obtained. Consequently, Δt'+T1=T2 is obtained, which is equal to the readout timing T2' of the peak point of the father's cap in the right-eye image PR similarly to the still object.

Summarizing the description given so far, when a moving object is imaged, the adjustment includes the movement of the target object, in other words, the displacement is adjusted in response to the movement. Therefore, parallax images not affected by any vertical shift between the optical axes and constituting a good three-dimensional image are obtained from the left-eye image and the right-eye image. The vertical displacement is not an issue in the case of a moving object moving horizontally. It is a depth displacement that may be generated in the horizontally moving object. A target object moving slantwise is irrelevant to any horizontal components, and vertical components are favorably corrected by the adjustment according to the example.

Figure 9:
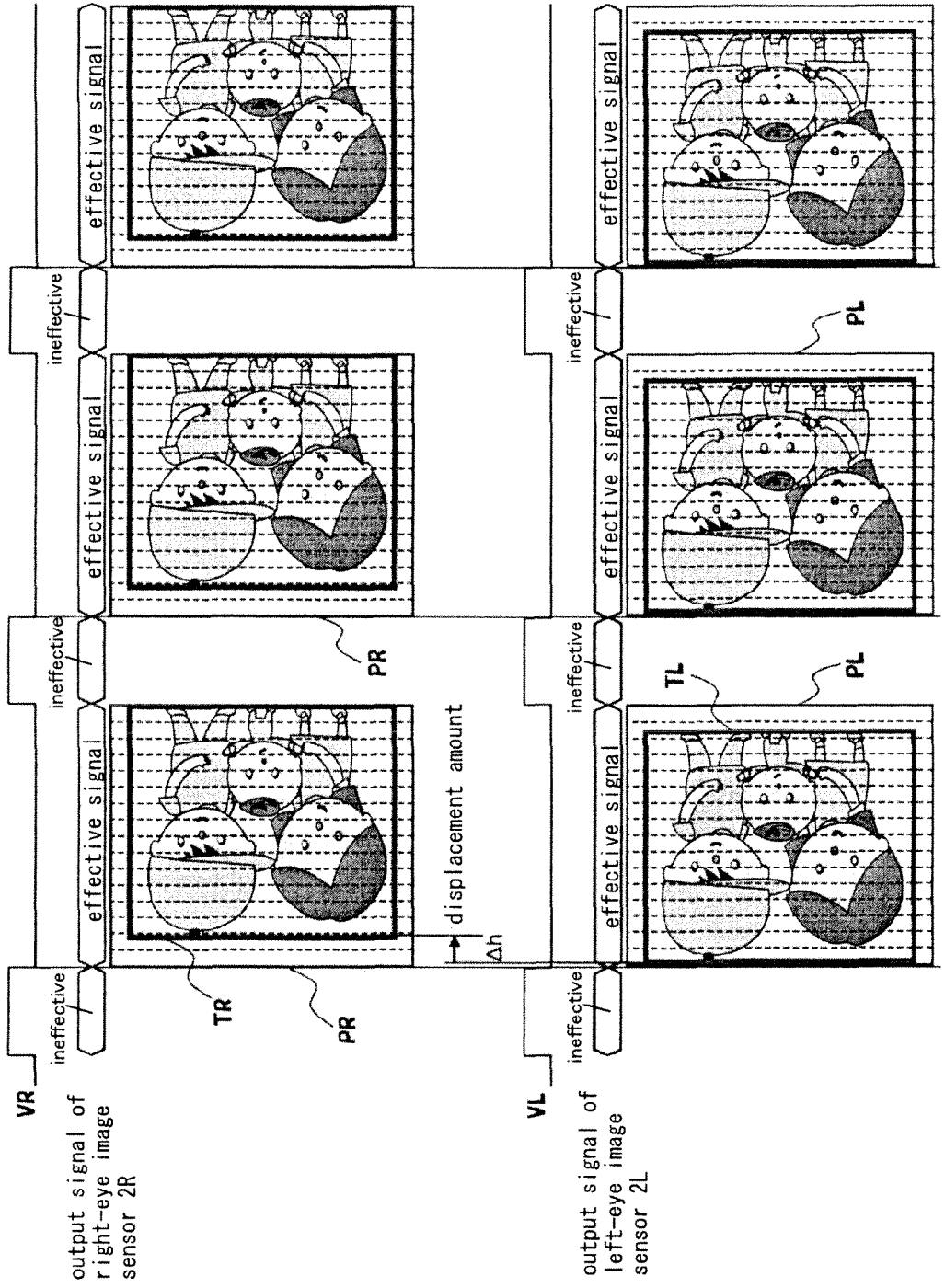
FIG. 9 is a timing chart for describing an operation of the illustration of FIG. 7 according to the example.
Figure 10:
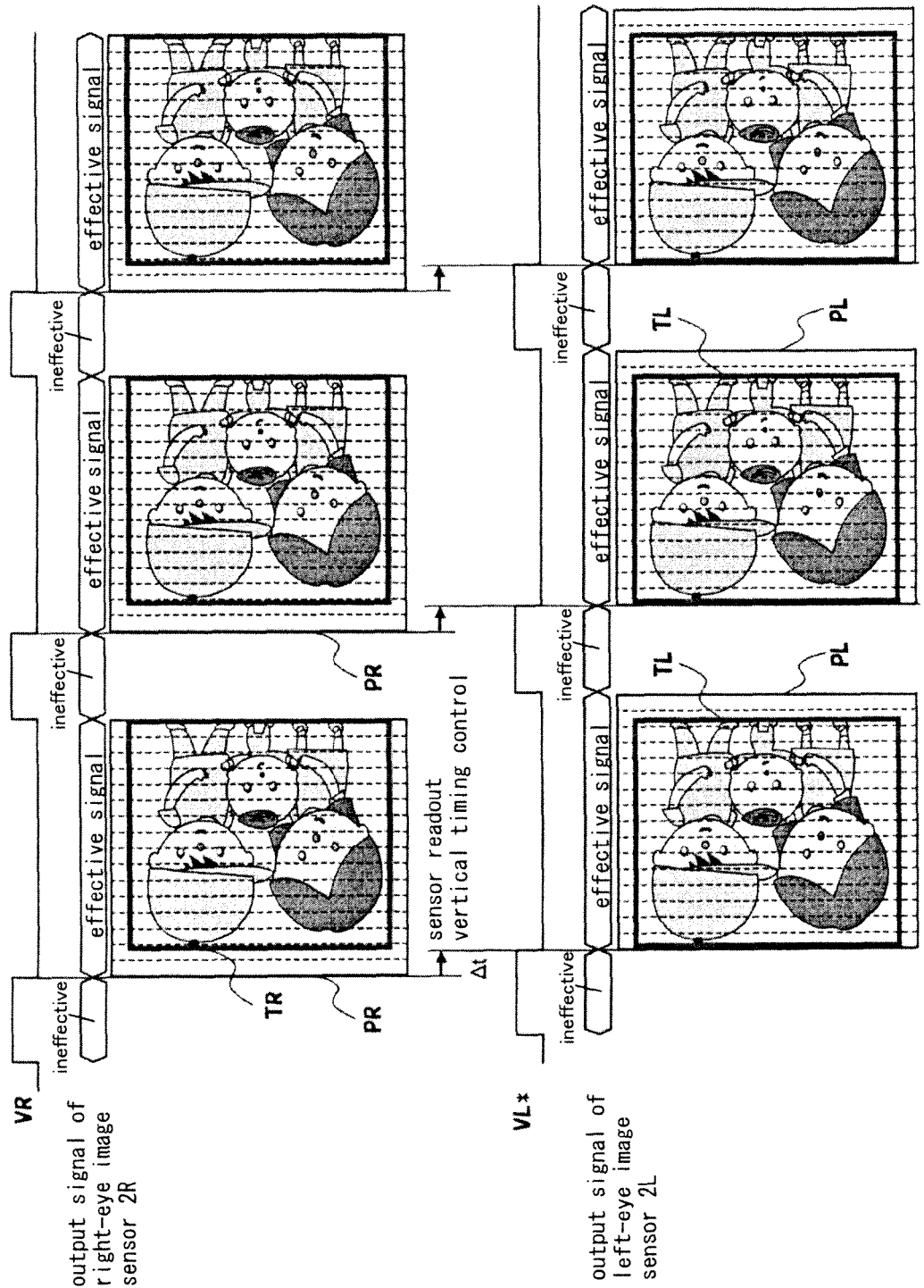
FIG. 10 is a timing chart for describing an operation of the illustration of FIG. 8 according to the example.

FIG. 9 is a timing chart for describing an operation for the illustration of FIG. 7 according to the example. FIG. 10 is a timing chart for describing an operation for the illustration of FIG. 8 according to the example. These drawings both show the left-eye images PL and the right-eye images PR for three frames. FIG. 9 is a timing chart of FIG. 2, while FIG. 10 is a timing chart of FIG. 3. Referring to FIGS. 9 and 10, rise timings of the vertical synchronizing signals VL and VR are equal to the timing of the readout-start pulse SP in the first line (not illustrated in the drawings).

According to the timing chart of FIG. 9 for the pre-adjustment illustration of FIG. 7, the vertical synchronizing signal VL for the left-eye image sensor 2L and the vertical synchronizing signal VR for the right-eye image sensor 2R have an equal timing. In that case, any spatial vertical displacement is directly reflected on the direction of time axis. When these left-eye image PL and right-eye image PR are combined as parallax images, a three-dimensional image thereby obtained is an unbalanced image visually causing a sense discomfort.

According to the timing chart of FIG. 10 for the post-adjustment illustration of FIG. 7, the timing of a vertical synchronizing signal VL* of the image sensor 2L capturing the left-eye image PL in which the target object image AL is displaced upward because of the optical axis shifted downward is delayed by the amount of delay Δt as compared to the timing of the vertical synchronizing signal VR of the right-eye image sensor 2R. Then, the left-eye and right-eye images PL and PR and the left-eye and right-eye target object images AL and AR obtained as parallax images have neither any vertical displacement nor timing shift.

<Confirmation and Adjustment of Vertical Displacement by Manual Operation>

So far was not described specifically how to confirm the vertical displacement between the left-eye image PL and the right-eye image PR. Hereinafter, the vertical displacement confirmation between the left-eye image PL and the right-eye image PR is specifically described. In description given below, the vertical displacement is manually adjusted.

Figure 11:
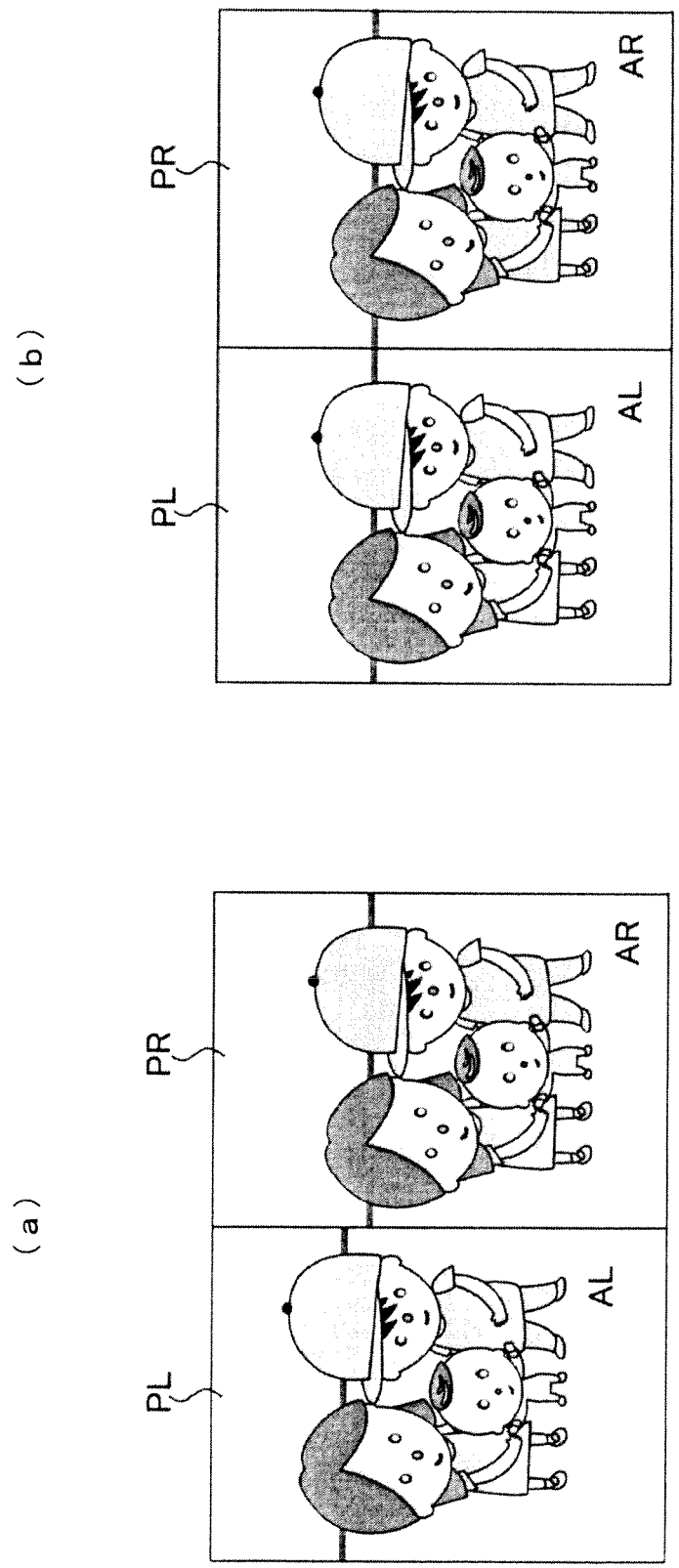
FIG. 11 are drawings 1 respectively illustrating states where images for left eye and right eye are displayed on a monitor display according to the example.

FIG. 11 are drawings 1 respectively illustrating states where the left-eye image PL and the right-eye image PR are displayed on a monitor display. FIG. 11 a) illustrates the pre-adjustment state, while FIG. 11 b) illustrates the post-adjustment state.

As illustrated in FIG. 11 a), the camera processor 200 image-processes the left-eye image PL and the right-eye image PR to resize these images in a monitor size, and displays the resulting images on the monitor display, though not illustrated in the drawings, connected to the monitor interface 53. Describing the display of the images on the monitor display, the left-eye image PL horizontally reduced to a half of its original size is displayed on a left-half side of the screen, while the right-eye image PR horizontally reduced to a half of its original size is displayed on a right-half side of the screen. The left-eye image PL and the right-eye image PR are vertically displaced relative to each other due to a shift between the optical axes thereof.

The operator (who is capturing images), while confirming the vertical displacement between the left-eye image PL and the right-eye image PR displayed on the screen, performs the manual adjustment to correct the vertical displacement by manipulating the operation panel 54. The operator manually manipulates the operation panel 54 to shift downward the left-eye image PL having the target object image AL displaced upward. In the case where the images include the target object horizontally extending, the operator vertically adjusts the images to ensure continuity between the left-eye image PL and the right-eye image PR. In an imaging operation outdoors, the vertical displacement is preferably adjusted based on a horizontal line or a distant landscape.

After the manual adjustment described so far, the CPU 41 calculates number of lines comparable to an amount of the operation and converts the calculated number of lines to time to calculate the amount of delay $\Delta t$. The CPU 41 transmits the calculated amount of delay $\Delta t$ to the frame synchronization drive controller 3 by way of the pre-processing unit 44. The frame synchronization drive controller 3 sets the received amount of delay $\Delta t$ in one of the image sensors 2L and 2R to be adjusted (downward shift of optical axis, upward displacement of image). As a result of such a manual adjustment, the left-eye image PL and the right-eye image PR obtained as parallax images have no spatial or temporal displacement therebetween, and a three-dimensional image obtained from these images has a good image quality.

An example of the calculation of number of lines by the CPU 41 is described below. The CPU 41 may calculate the number of lines to be adjusted based on an amount of operation in the vertical direction in the manual adjustment performed by the operator depending on an initial display state on the screen of the monitor display, or the CPU 41 sets the trimming areas TL and TR in the left-eye image PL and the right-eye image PR on an initial screen and calculates the number of lines from information relating to a differential between Y coordinates of start positions at which the trimming areas start. In place of the number of lines, number of pixels in the vertical direction may be obtained.

Figure 12:
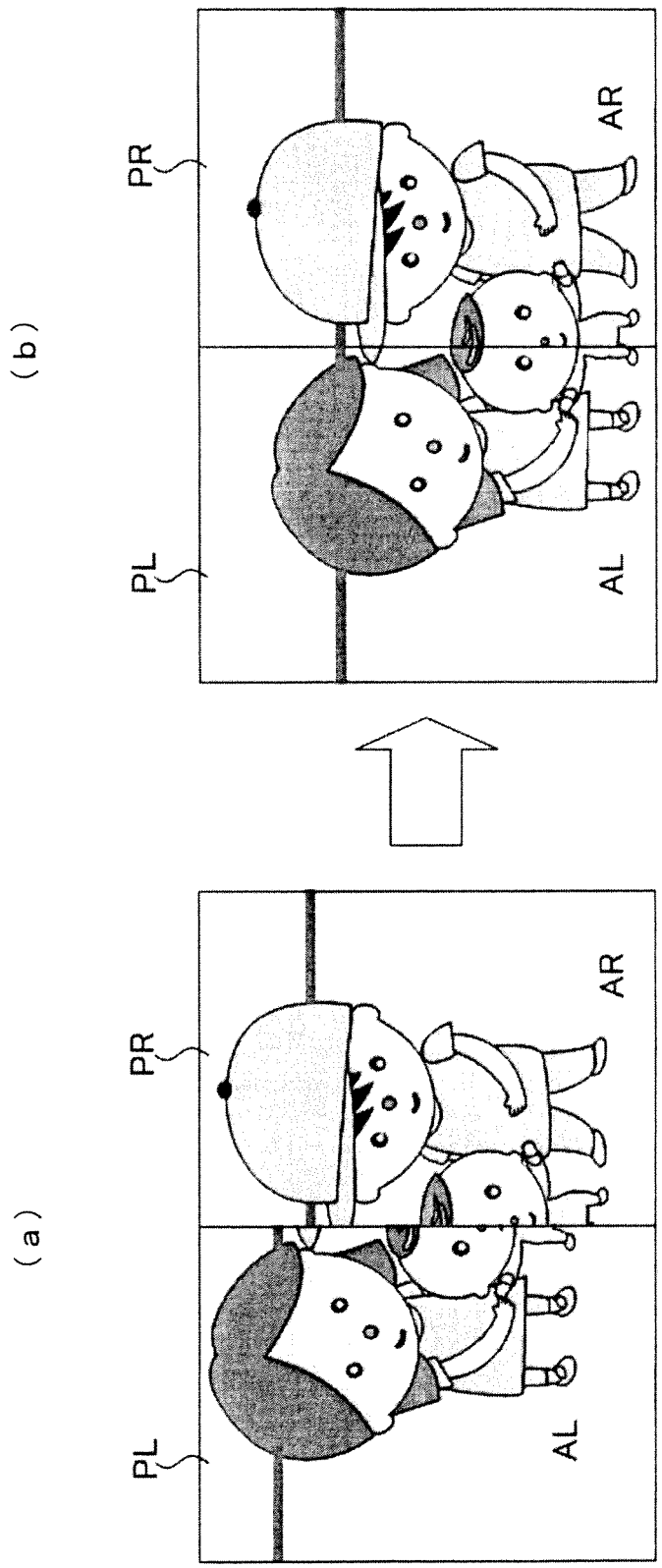
FIG. 12 are drawings 2 respectively illustrating states where images for left eye and right eye are displayed on a monitor display according to the example.

FIG. 12 are different drawings respectively illustrating states where the left-eye image PL and the right-eye image PR are displayed on the monitor display. FIG. 12 *a*) illustrates the pre-adjustment state, while FIG. 12 *b*) illustrates the post-adjustment state.

As illustrated in FIG. 12 *a*), the camera processor 200 image-processes the left-eye image PL and the right-eye image PR to display the left-eye image PL horizontally reduced to a half of its original size on the left-half side of the screen and display the right-eye image PR horizontally reduced to a half of its original size on the right-half side of the screen. The left-eye image PL and the right-eye image PR are vertically displaced relative to each other due to a shift between the optical axes thereof. The displacement is particularly conspicuous in a boundary (longitudinally center line) between the left-side display area and the right-side display area.

The operator (who is capturing images), while confirming the vertical displacement between the left-eye image PL and the right-eye image PR displayed on the screen, performs the manual adjustment to correct the vertical displacement by manipulating the operation panel 54. The operator manually manipulates the operation panel 54 to shift downward one of the images having the target object image AL displaced upward (left-eye image PL in the illustrated example). In the case where the images include the target object horizontally extending, the operator vertically adjusts the images to ensure continuity between the left-eye image PL and the right-eye image PR and also confirms a vertical balance of the target object image positioned on the center line. In the illustrated example, a whole body of the target object image is split in a left-side body part and a right-side body part, and some parts of the left-side body part and the right-side body part are misaligned in the vertical direction. It is relatively easy for the operator to precisely align the left and right sides of the body manually because he only needs to take the left-right balance of the body including his/her face. In an imaging operation outdoors, the vertical displacement may be adjusted based on a horizontal line or a distant landscape.

After the manual adjustment described so far, the CPU 41 calculates number of lines comparable to an amount of the operation and converts the calculated number of lines to time to calculate the amount of delay $\Delta t$. The CPU 41 transmits the calculated amount of delay $\Delta t$ to the frame synchronization drive controller 3 by way of the pre-processing unit 44. The frame synchronization drive controller 3 sets the received amount of delay $\Delta t$ in one of the image sensors 2L and 2R to be adjusted (downward shift of optical axis, upward displacement of image). As a result of such a manual adjustment, the left-eye image PL and the right-eye image PR obtained as parallax images have no spatial or temporal displacement therebetween, and a three-dimensional image obtained has a good image quality.

<Confirmation and Adjustment of Vertical Displacement by Manual Operation>

Figure 13:
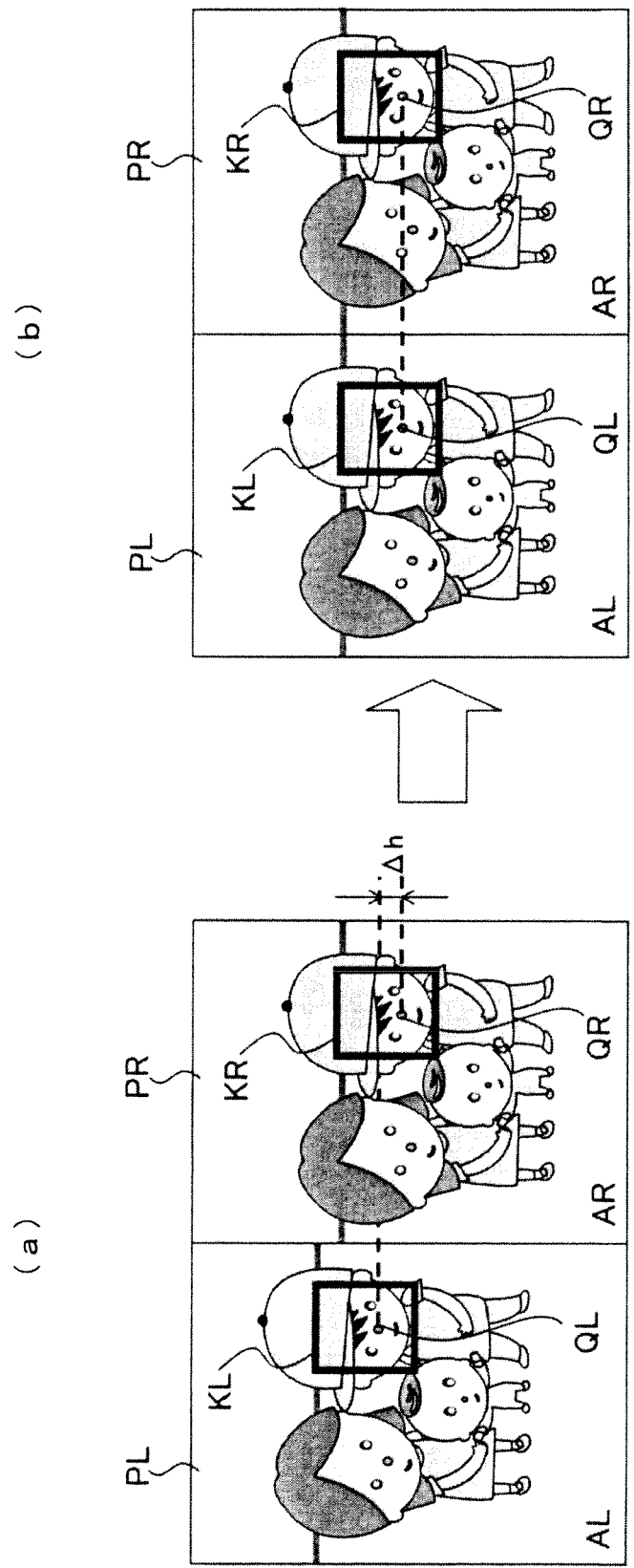
FIG. 13 are drawings illustrating of detection of a face region according to the example.

As illustrated in FIG. 13 *a*), face regions KL and KR are detected respectively in the left-eye image PL and the right-eye image PR, and points of attention QL and QR are extracted from the detected face regions KL and KR. Examples of the points of attention QL and QR are eye, mouth, ear, and nose. Then, Y coordinates of the extracted points of attention QL and QR are obtained, and a differential between the Y coordinates is used as the amount of vertical displacement $\Delta h$. The amount of vertical displacement $\Delta h$ is converted to the amount of delay $\Delta t$, and the converted amount of delay $\Delta h$ is transmitted to the frame synchronization drive controller 3. Then, the output timing of the readout-start pulse SP of one of the image sensors in which the framing position of the target object image is displaced upward is delayed by the amount of delay $\Delta t$. As a result, the left-eye image PL and the right-eye image PR are obtained in a well-balanced manner as parallax images.

<Automatic Adjustment of Vertical Displacement>

Figure 14:
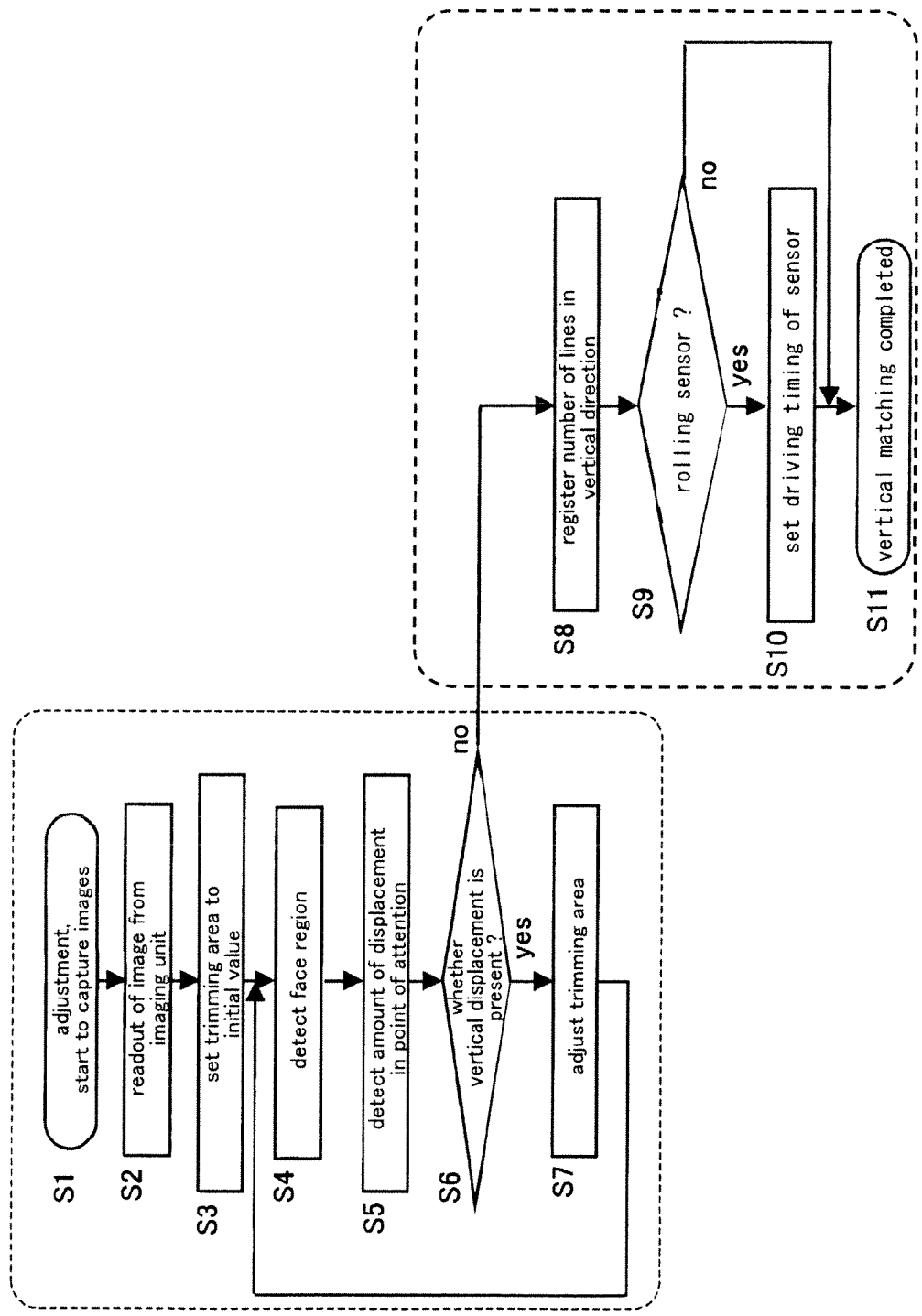
FIG. 14 is a flow chart of processing steps by the three-dimensional imaging device according to the example.

Next, an automatic adjustment method is described, wherein the manual operation by the operator is unnecessary. FIG. 14 is a flow chart of processing steps by the three-dimensional imaging device characterized as described so far. A control operation described below is mostly handled by the CPU 41 of the camera processor 200 and peripheral devices of the CPU 41. The ongoing adjustment by respective processing steps may be may not be displayed on the monitor display.

Figure 15:
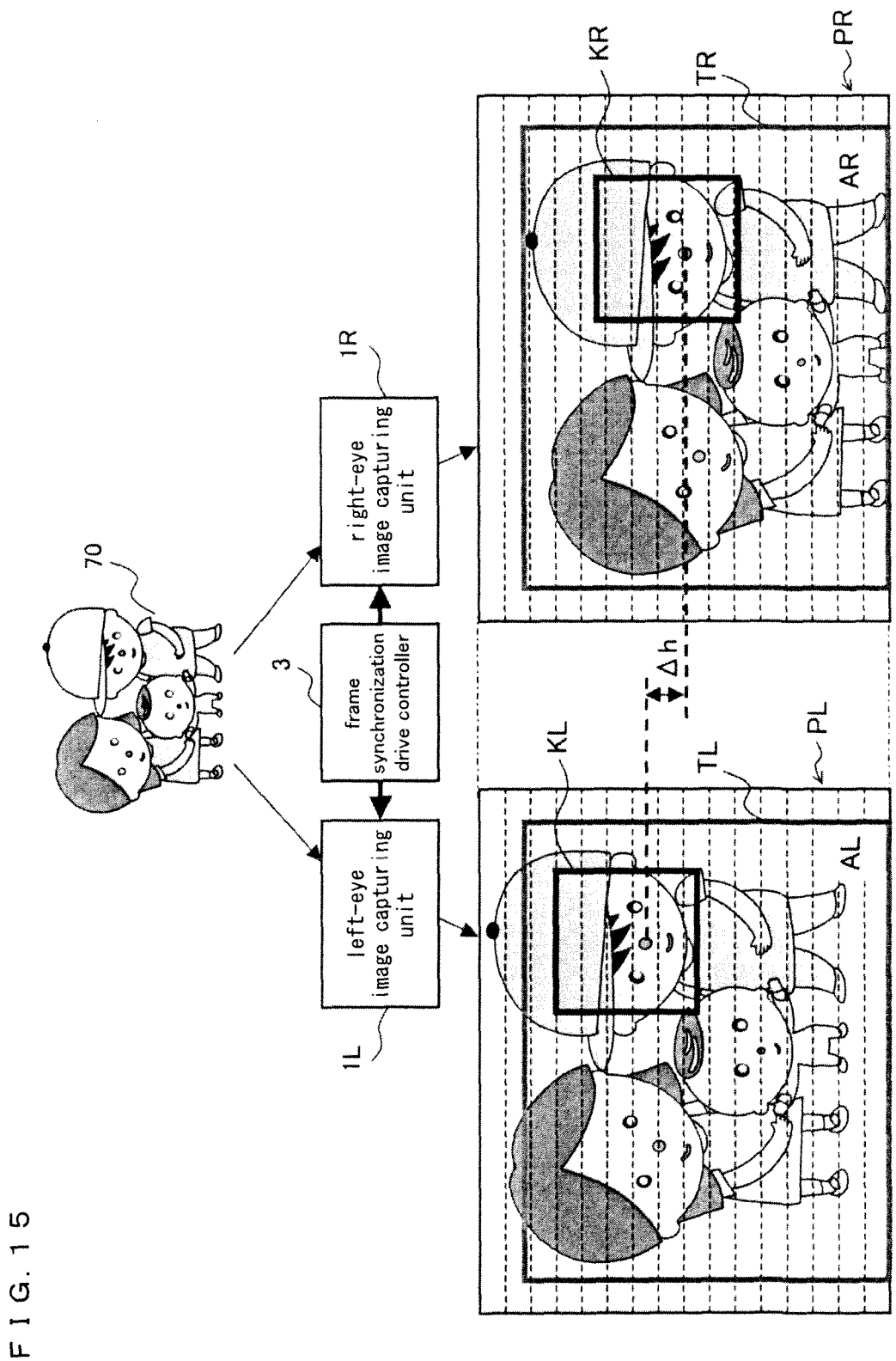
FIG. 15 is an illustration of an intermediate stage during adjustment of trimming areas according to the example.

Step S1 starts the imaging operation including the vertical displacement adjustment. Step S2 reads the left-eye image PL and the right-eye image PR respectively captured by the left-eye image sensor 2L and the right-eye image sensor 2R. Step S3 sets the trimming areas TL and TR in an initial state in the left-eye image PL and the right-eye image PR at corresponding positions in effective pixel areas of the left-eye image sensor 2L and the right-eye image sensor 2R. Step S4 detects the face regions of the left-eye target object image AL and the right-eye target object image AR in the left-eye and right-eye trimming areas TL and TR. Step S5 detects the amount of vertical displacement $\Delta h$ between the points of attention QL and QR in the detected face regions KL and KR. Examples of the points of attention QL and QR are eye, mouth, ear, and nose. Step S6 confirms whether there is any vertical displacement. The flow proceeds to Step S7 when the vertical displacement is confirmed in Step S6, while proceeding to Step S8 with no vertical displacement. When the flow proceeds to Step 7 after the vertical displacement is detected, the trimming areas TL and TR are adjusted, and the flow returns to Step S4. FIG. 15 is an illustration of an intermediate stage during the adjustment of the trimming areas TL and TR.

After a cycle of Steps S4→S5→S6→S7 is repeatedly performed, the points of attention QL and AR are finally equally positioned with no vertical displacement therebetween. As a result, the two images become vertically consistent with each other as illustrated in FIG. 8.

In Step S4 for detecting the face region, the face region may be detected-in the image of an original size directly read from the image sensor or the image reduced to any arbitrary size. As far as an equal resizing ratio is applied to the left-eye image PL and the right-eye image PR, the resizing ratio is arbitrarily changeable. The number of lines for vertical displacement is calculated by multiplying the detected number of lines by a reverse number of the resizing ratio.

In the transition from Step S6 to Step S8, the number of lines for vertical displacement upon completion of the automatic setting of the trimming areas has been confirmed by the CPU 41. In Step S8, the number of lines for vertical displacement is registered. Then, Step S9 determines whether the electronic shutters of the image sensors are rolling shutters or global shutters. The flow proceeds to Step S10 when confirmed that the electronic shutters are rolling shutters, while proceeding to Step S11 otherwise. In Step S10, after confirming that the electronic shutters are rolling shutters, the amount of delay $\Delta t$ obtained form the number of lines calculated earlier for the timing of the vertical synchronizing signal generated from the common reference synchronizing signal shared by the left-eye and right-eye image sensors 2L and 2R is transmitted to the frame synchronization drive controller 3. As a result, the electronic shutter start pulse ESSP and the readout-start pulse SP are outputted from one of the image sensors to be adjusted (downward shift of optical axis, upward displacement of image) by a timing delayed from a normal timing by the amount of delay $\Delta t$. As a result, parallax images obtained to be displayed and/or recorded have no spatially vertical displacement between the left-eye image and the right-eye image to ensure simultaneity, and a three-dimensional image thereby obtained has a good image quality.

far was described the adjustment of the vertical displacement, but in fact, an image displacement may be horizontally generated. The horizontal displacement is a parallax when a person is viewing a three-dimensional image. In the field of production of three-dimensional images, the horizontal displacement is associated with characteristics called a base line length and visually recognized as a displacement in the depth direction of a three-dimensional image. On image productions, the base line length is a parameter often finely adjusted along with setting of distance to a target object to be imaged and adjustment of angle of convergence. However, the invention omits any detailed description of the automatic horizontal adjustment.

<Variable Power Lens/Zoom Ratio>

When the zoom ratio of the variable power lens 11, 21 is changed, the amount of delay $\Delta t$ of the readout-start pulse SP in the frame synchronization drive controller 3 is changed in proportion to a rate of change of the zoom ratio. Particularly, the zoom for enlargement causes a larger delay to the exposure timing. Therefore, the amount of delay $\Delta t$ of the readout-start pulse SP needs to be adjusted in accordance with the zoom ratio.

The numbers of lines in the vertical direction of an imaging area on the most wide angle side and most telescopic side of the variable power lens are registered in advance. The number of displacement lines on the most wide angle side is Lw, the number of displacement lines on the most telescopic side is LT, and a magnifying power on the most telescopic side for an image on the most wide angle side is set to n times. Then, the number of displacement lines Lb by an arbitrary magnifying power b is calculated. A vertical mounting displacement is calculated as number of lines.

An amount of change per side for n times is $\sqrt{n}$ ($\sqrt{n}$ denotes the square root of n), and an amount of change per side for n times is $\sqrt{b}$. Therefore, $Lb=[(Lt-Lw)/\sqrt{n}]\times\sqrt{b}+Lw$. This is the number of displacement lines when the magnifying power b is used. The amount of delay $\Delta t$ of the drive timing is calculated from the number of lines for feedback. The amount of delay $\Delta t$ is set in one of the image sensors where the target object image is displaced upward with the optical axis shifted downward. As a result, irrespective of any change of the zoom ratio of the variable power lens, parallax images obtained to be displayed/recorded have no spatial or temporal displacement between the left-eye image PL and the right-eye image PR, thereby ensuring simultaneity of the images, and a three-dimensional image obtained from these images has a good image quality.

The camera processor 200 later sets the trimming areas TL and TR in the whole imaging areas of the left-eye image sensor 2L and the right-eye image sensor 2R and processes the images into a three-dimensional image. During the image process, the vertical displacement is handled as ineffective data.

<Camera System>

Figure 16:
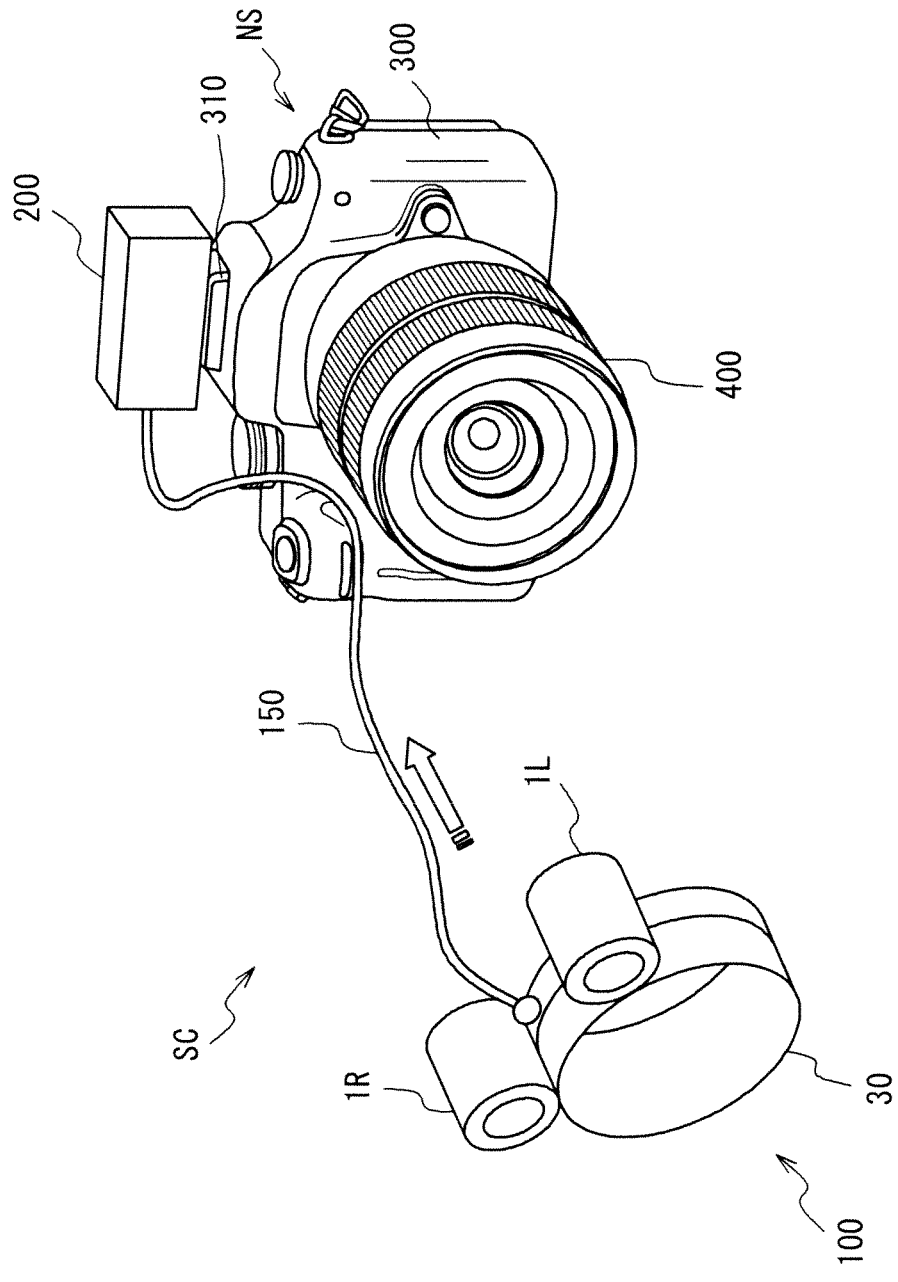
FIG. 16 is a perspective view 1 of a camera system according to the example.

FIG. 16 illustrates an example of the camera system, which is a hybrid imaging system including a three-dimensional imaging adapter. The hybrid imaging system has a combination of a stereo camera SC for capturing a three-dimensional image and a non-stereo camera NS which is a conventional imaging camera not designed for three-dimensional imaging.

The stereo camera SC includes a three-dimensional imaging device 100, a data communication device 150, and a camera processor 200. The three-dimensional imaging device 100 and the camera processor 200 are electrically connected to each other through the data communication device 150 including cables. Image signals outputted from the left-eye image capturing unit 1L and the right-eye image capturing unit 1R of the three-dimensional imaging device 100 are inputted to the camera processor 200 through the data communication device 150. The camera processor 200 receives the image signals obtained by the left-eye image capturing unit 1L and the right-eye image capturing unit 1R and performs image processes to the received image signals. These image processes include recording of image data. Further, the camera processor 200 is functioned to drive the left-eye image capturing unit 1L and the right-eye image capturing unit 1R.

The three-dimensional imaging device 100 includes the left-eye image capturing unit 1L and the right-eye image capturing unit 1R which independently transmit therethrough light flux of a target object to be imaged, and a lens hood 30 mounted with the image capturing units 1L and 1R. The non-stereo camera NS includes a camera body 300 and a lens tube 400. The lens tube 400 is detachably mounted on a mounting part of the camera body 300. The lens hood 30 is structured to attachable to one end of the lens tube 400 of the non-stereo camera NS. The camera processor 200 is structured to be attachable to a hot shoe 310 of the camera body 300. The non-stereo camera NS and the stereo camera SC can transmit and receive signals to and from each other by way of the hot shoe 310. The other end of the lens tube 400 has a mounting part to be combined with the mounting part of the camera body 300. The three-dimensional imaging device 100 is detachably mounted on the lens tube 400 of the non-stereo camera NS in the lens hood 30 so that a front part of the lens tube 400 is unblocked but is left open.

In the illustrated example, the three-dimensional imaging device 100, data communication device 150, and camera processor 200 constitute the three-dimensional imaging adapter, and the three-dimensional imaging adapter constitutes the stereo camera SC.

Structurally describing the left-eye image capturing unit 1L, right-eye image capturing unit 1R, an optical lens, an iris for adjusting an amount of incident light, a mechanical shutter, an optical low-pass filter, and an image sensor are provided in the mentioned order. A motor which moves a lens holding frame in a direction of optical axis includes an auto focus motor (AF motor) for moving a focusing lens and a zoom lens motor for moving a zoom lens. The AF motor, zoom lens motor, and iris motor are driven by a motor controller provided in the camera processor 200. The image sensor is positioned perpendicular to the optical axis of the imaging lens. A sub circuit substrate of the three-dimensional imaging device 100 provided with the left-eye and right-eye image capturing units 1L and 1R is connected to a main circuit substrate of the camera processor 200 by way of the data communication device 150. These circuit substrates have contact points and terminals, which allow cable communication along with serial interfaces described later.

There are other examples of the connection method. One of the examples is to provide a plurality of contact points (not illustrated in the drawings) on the front mounting parts of the three-dimensional imaging device 100 and the lens tube 400 and similarly provide terminals to be in contact with the connection terminals (not illustrated in the drawings) in the mounting parts of the lens tube 400 and the camera body 300, and further provide a plurality of contact points (not illustrated in the drawings) in the main circuit substrate of the camera processor 200 and the hot shoe 310 of the camera body 300. These contact points and terminals connected through the mounting parts allow data communication along with serial interfaces described later.

The other example is to provide optical output/input terminals to connect the sub circuit substrate of the three-dimensional imaging device 100 and the main circuit substrate of the camera processor 200 to each other using optical fiber. These optical contacts and terminals connected through the optical cable allow optical communication along with serial interfaces described later.

On a back surface of the camera body 300 are provided a liquid crystal panel on which through images of a target object to be imaged and menu images are displayed, a display button for switching on and off the liquid crystal panel, an arrow key used to select any wanted item from the menu images displayed on the liquid crystal panel, and an execution button (not illustrated in the drawings) pressed to display a menu screen and confirm an selected menu item.

On a back surface of the camera processor 200 may be provided a liquid crystal panel on which through-the-lens images of a target object and menu images are displayed, a display button for switching on and off the liquid crystal panel, an arrow key used to select any wanted item from the menu images displayed on the liquid crystal panel, and an execution button (not illustrated in the drawings) pressed to display a menu screen and confirm an selected menu item.

When the various buttons on the back surface of the camera processor 300 are pressed or manipulated, respective modes of the camera body 300 are switched to and from one another; still imaging mode, moving imaging mode, nighttime imaging mode, and strobo imaging mode. The three-dimensional imaging device 100 is operable by either manipulating the camera body 300 or manipulating the camera processor 200.

The three-dimensional imaging device 100 is detachably mounted on the front end of the lens tube 400. The three-dimensional imaging device 100 is mounted with a high precision on the front end of the lens tube 400 via a bayonet mechanism. The bayonet mechanism is a simplified fitting mechanism of socket type for coupling and decoupling by twisting a claw pushed into a groove. A connection terminal is provided in an outer periphery of the front end of the lens tube 400 to be contacted by an output terminal (transmitter) of the three-dimensional imaging device 100. An example of the transmitter other than the output terminal is a wireless communication interface provided with a modulator which modulates data to generate a transmission signal and an antenna for transmitting the transmission signal.

When the three-dimensional imaging device 100 and the camera processor 200 are mounted on the non-stereo camera NS, a three-dimensional image and a normal image can be captured at the same time respectively by the stereo camera SC and the non-stereo camera NS. While the three-dimensional imaging device 100 and the camera processor 200 are not mounted thereon, the normal imaging operation is performed by the non-stereo camera NS. The three-dimensional imaging adapter according to the illustrated example may be independently used as a three-dimensional image camera.

Figure 17:
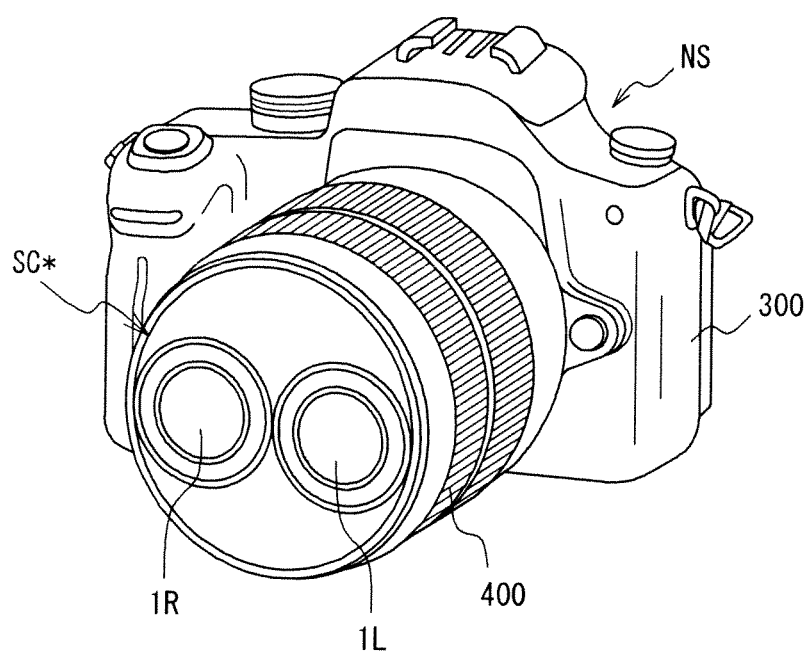
FIG. 17 is a perspective view 2 of a camera system according to the example.

The block diagram of FIG. 6 illustrates a specific example of the stereo camera SC including the three-dimensional imaging device 100 and the camera processor 200, and FIG. 17 illustrates another example. The non-stereo camera NS used by the operator is a single-lens camera, which is a lens-replaceable stereo camera SC* in which the left-eye and right-eye image capturing units 1L and 1R are combined. When the lens-replaceable stereo camera SC* is mounted on the lens mounting part of the non-stereo camera NS, a three-dimensional image can be captured.

As described thus far, the three-dimensional imaging device according to the invention, when using a high-speed electronic shutter characterized by an few-line exposure time in a rolling shutter type MOS sensor, a three-dimensional image can be obtained from images captured by two image capturing units and subjected to exposure of the same duration irrespective of a relative vertical shift between optical axes of the image capturing units. The three-dimensional image thus obtained has no displacement between moving objects of two images that would be generated by different timings of the high-speed electronic shutter. Therefore, an inter-image boundary is not blurred, and horizontal parallax adjustment can be easily done through image processes. When the three-dimensional image is viewed, therefore, it gives a clear and vivid three-dimensional sensation. Further, any mounting variability between a plurality of image capturing units can be digitally processed, and the lens tube mechanism is structurally simplified for cost reduction.

The invention is not necessarily limited to the examples described so far and variously modified within its technical scope.

INDUSTRIAL APPLICABILITY

The invention provides a very advantageous technology, wherein a vertical shift between optical axes of a left-eye image capturing unit and a right-eye image capturing unit, if generated, is reliably corrected, and parallax images obtained to be displayed and/or recorded have no spatially vertical displacement between a left-eye image and a right-eye image, thereby ensuring simultaneity of the images. As a result, a three-dimensional image obtained these images has a good image quality.

DESCRIPTION OF REFERENCE SYMBOLS 1L left-eye image capturing unit
1R right-eye image capturing unit
2L left-eye image sensor
2R right-eye image sensor
3 frame synchronization drive controller]
4 camera processor
5 vertical timing adjuster
6 operation unit
7L, 7R point of attention coordinate calculator
8 vertical displacement amount calculator
9 delay amount calculator
10 drive timing setter
11, 21 variable power lens
41 CPU
44 pre-processing unit
45 memory controller
46 image memory
50 face region detector
53 monitor interface
54 operation panel
100 three-dimensional imaging device
200 camera processor
PL left-eye image
PR right-eye image
AL left-eye target object image
AR right-eye target object image
TL left-eye trimming area
TR right-eye trimming area
PTL left-eye trimming image
PTR right-eye trimming area
SP readout-start pulse
ESSP electronic shutter start pulse (shutter gate pulse)
KL, KR detected face region
QL, QR point of attention
Δh amount of vertical displacement
Δt amount of delay

What is claimed is:

1. A three-dimensional imaging device, including:
a left-eye image capturing unit for left eye having an image sensor for left eye;
a right-eye image capturing unit for right eye having an image sensor for right eye;
a frame synchronizing drive controller for driving the left-eye image sensor and the right-eye image sensor in a frame synchronizing manner;
a camera processor for image-processing an image for left eye captured by the left-eye image capturing unit and an image for right eye captured by the right-eye image capturing unit to generate a parallax image of the left-eye image and the right-eye image;
a vertical timing adjuster for adjusting timings of driving the left-eye image sensor and the right-eye image sensor using the frame synchronizing drive controller to reduce as close to zero as possible an amount of vertical displacement between a framing position of a target object image in the left-eye image and a framing position of a target object image in the right-eye image;
an operation unit for generating a displacement adjustment command signal to instruct the vertical timing generator to adjust the drive timing through a manual operation by an operator of the three-dimensional imaging device, and
a monitor on which a first image and a second image are displayed,
wherein the vertical timing adjuster adjusts the drive timing using the frame synchronizing drive controller based on the displacement adjustment command signal, and
the camera processor reduces a pair of left and right trimming images for the pair of left and right trimming areas positionally set so that relative positions of the same target object at a time point are consistent with each other into a monitor size and displays the reduced pair of left and right trimming images on left and right sides of the monitor.

2. The three-dimensional imaging device as claimed in claim 1, wherein the vertical timing adjuster calculates an amount of displacement between a pair of left and right trimming areas positionally set so that relative positions of the same object at a time point in the left-eye image and the right-eye image are consistent with each other and sets an amount of delay of the drive timing corresponding to the calculated amount of displacement in the frame synchronizing drive controller.

3. The three-dimensional imaging device as claimed in claim 1, wherein the left-eye image sensor and the right-eye image sensor are MOS (Metal Oxide Semiconductor) image sensors each having a rolling shutter as an electronic shutter for exposure control.

4. The three-dimensional imaging device as claimed in claim 1, wherein
the drive timing includes a timing of outputting a vertical synchronizing signal, and
the vertical timing adjuster delays the timing of outputting the vertical synchronizing signal in one of the left image sensor and the right image sensor capturing the left-eye image or the right-eye image where the framing position of the target object image is upward relative to the framing position in the other from a timing of a reference synchronizing signal by a vertical scan period comparable to number of lines corresponding to the vertical displacement.

5. The three-dimensional imaging device as claimed in claim 3, wherein
the drive timing includes a shutter pulse of the rolling shutter and a timing of outputting a readout-start pulse, and
the vertical timing adjuster delays the shutter pulse and the readout-start pulse simultaneously by an amount of delay equal to the delay of the vertical synchronizing signal of the left-eye image sensor, the right-eye image sensor.

6. The three-dimensional imaging device as claimed in claim 1, wherein the vertical timing adjuster converts the vertical displacement to an amount of number-of-line displacement and sets the amount of number-of-line displacement as the amount of delay of the drive timing in one of the left-eye image sensor and the right-image image sensor capturing the left-eye image or the right-eye image where the framing position of the target object image is upward relative to the framing position in the other.

7. The three-dimensional imaging device as claimed in claim 1, wherein the vertical timing controller transmits an amount of adjustment of the drive timing to the frame synchronization drive controller through a manual operation by an operator of the three-dimensional imaging device.

8. The three-dimensional imaging device as claimed in claim 1, wherein the vertical timing controller automatically transmits an amount of adjustment of the drive timing to the frame synchronization drive controller.

9. The three-dimensional imaging device, including:
a left-eye image capturing unit for left eye having an image sensor for left eye;
a right-eye image capturing unit for right eye having an image sensor for right eye;
a frame synchronizing drive controller for driving the left-eye image sensor and the right-eye image sensor in a frame synchronizing manner;
a camera processor for image-processing an image for left eye captured by the left-eye image capturing unit and an image for right eye captured by the right-eye image capturing unit to generate a parallax image of the left-eye image and the right-eye image;
a vertical timing adjuster for adjusting timings of driving the left-eye image sensor and the right-eye image sensor using the frame synchronizing drive controller to reduce as close to zero as possible an amount of vertical displacement between a framing position of a target object image in the left-eye image and a framing position of a target object image in the right-eye image;
an operation unit for generating a displacement adjustment command signal to instruct the vertical timing generator to adjust the drive timing through a manual operation by an operator of the three-dimensional imaging device, and
a monitor on which a first image and a second image are displayed,
wherein the vertical timing adjuster adjusts the drive timing using the frame synchronizing drive controller based on the displacement adjustment command signal, and
the camera processor reduces a left-half image located on a left-half side of the left trimming image for the left trimming area of the pair of left and right trimming areas positionally set so that relative positions of the same target object at a time point are laterally consistent with each other into a half size of a monitor size and displays the reduced left-half image on a left side of the monitor, and the camera processor further reduces a right half image located on a right-half side of the right trimming image for the right trimming area of the pair of left and right trimming areas into a half size of the monitor size and displays the reduced right-half image on a right side of the monitor.

10. The three-dimensional imaging device as claimed in claim 1, wherein the vertical timing adjuster uses, as the amount of delay of the drive timing, an amount of delay calculated when a differential between positional information of the starting line of the left-eye trimming area and positional information of the starting line of the right-eye trimming area is obtained and converted to time.

11. The three-dimensional imaging device as claimed in claim 9, wherein the vertical timing adjuster uses, as the amount of delay of the drive timing, an amount of delay calculated when a differential between positional information of the starting line of the left-eye trimming area and positional information of the starting line of the right-eye trimming area is obtained and converted to time.

12. The three-dimensional imaging device, including:
a left-eye image capturing unit for left eye having an image sensor for left eye;
a right-eye image capturing unit for right eye having an image sensor for right eye;
a frame synchronizing drive controller for driving the left-eye image sensor and the right-eye image sensor in a frame synchronizing manner;
a camera processor for image-processing an image for left eye captured by the left-eye image capturing unit and an image for right eye captured by the right-eye image capturing unit to generate a parallax image of the left-eye image and the right-eye image; and
a vertical timing adjuster for adjusting timings of driving the left-eye image sensor and the right-eye image sensor using the frame synchronizing drive controller to reduce as close to zero as possible an amount of vertical displacement between a framing position of a target object image in the left-eye image and a framing position of a target object image in the right-eye image,
wherein the vertical timing adjuster includes:
a point-of-attention coordinate calculator for left eye and a point-of-attention coordinate calculator for right eye respectively for extracting a left-side point of attention in the left-eye image and a right-side point of attention in the right-eye image and calculating vertical coordinates of the left-side point of attention and the right-side point of attention;
a vertical displacement amount calculator for calculating the amount of vertical displacement from a differential between the vertical coordinates of the left-side point of attention and the right-side point of attention;
a delay amount calculator for converting the amount of vertical displacement to a time-based amount of delay of the drive timing; and
a drive timing setter for setting the drive timing plus the amount of delay in the frame synchronizing drive controller.

13. The three-dimensional imaging device as claimed in claim 12, further including a face region detector for detecting a face region of the target object in each of the left-eye image and the right-eye image, wherein
the point of attention coordinate calculators respectively set particular sites of the face regions detected by the face region detector in the left-side point of attention and the right-side point of attention.

14. The three-dimensional imaging device as claimed in claim 1, wherein the left-eye image capturing unit and the right-eye image capturing unit each has an optical system including a variable power lens, and the variable power lens of the left-eye image capturing unit and the variable power lens of the right-eye image capturing unit operate in tandem with each other.

15. The three-dimensional imaging device as claimed in claim 14, wherein the vertical timing adjuster changes the amount of delay of the drive timing depending on a zoom ratio variation of the variable power lens.

16. A three-dimensional imaging method, including:
a first step for calculating an amount of vertical displacement between a framing position of a target object image in an image for left eye captured by a left-eye image capturing unit having a left-eye image sensor and a framing position of a target object image in an image for right eye captured by a right-eye image capturing unit having a right-eye image sensor;
a second step for adjusting timings of driving the left-eye image sensor and the right-eye image sensor based on the calculated amount of vertical displacement; and
a third step for serially reading per line image data after exposure to light is completed respectively obtained from the left-eye image sensor and the right-eye image sensor driven by the adjusted drive timings, wherein the first step includes:
  a step 1-1 for displaying the left-eye image and the right-eye image side by side on a screen;
  a step 1-2 for positionally setting trimming areas so that relative positions of the same object at a time point in the left-eye image and the right-eye image are consistent with each other;
  a step 1-3 for extracting points of attention from the trimming areas of the left-eye and right-eye images; and
  a step 1-4 for detecting the amount of vertical displacement between the points of attention in the left-eye image and the right-eye image.

17. The three-dimensional imaging method as claimed in claim 16, wherein the step 1-4 detects the amount of vertical displacement by detecting an amount of positional shift when one of the trimming area of the left-eye image and the trimming area of the right-eye image is positionally shifted in the vertical direction so that the trimming areas are positionally consistent with each other.

18. The three-dimensional imaging method as claimed in claim 16, wherein the step 1-4 calculates a differential between a line number of a line where a point of attention in the trimming area of the left-eye image belongs and a line number of a line where a point of attention in the trimming area of the right-eye image belongs to detect the amount of vertical displacement.

19. The three-dimensional imaging method as claimed in claim 16, wherein particular sites of the face regions of the target object in the left-eye image and the right-eye image are used as the points of attention.

20. The three-dimensional imaging method, including:
  a first step for calculating an amount of vertical displacement between a framing position of a target object image in an image for left eye captured by a left-eye image capturing unit having a left-eye image sensor and a framing position of a target object image in an image for right eye captured by a right-eye image capturing unit having a right-eye image sensor;
  a second step for adjusting timings of driving the left-eye image sensor and the right-eye image sensor based on the calculated amount of vertical displacement;
  a third step for serially reading per line image data after exposure to light is completed respectively obtained from the left-eye image sensor and the right-eye image sensor driven by the adjusted drive timings,
  a fourth step for starting to capture the left eye image and the right-eye image;
  a fifth step for reading the left eye image and the right-eye image;
  a sixth step for initially setting the trimming areas respectively in the left eye image and the right-eye image;
  a seventh step for extracting the points of attention respectively in the trimming areas of the left-eye image and the right-eye image;
  an eighth step for confirming whether the vertical displacement is present between the point of attention in the left-eye image and the point of attention in the right-eye image;
  a ninth step for positionally adjusting vertically one of the trimming area of the left-eye image and the trimming area of the right-eye image when the presence of the vertical displacement is confirmed;
  a 10th step for repeating the seventh to ninth steps until the amount of vertical displacement finally reaches zero; and
  an 11th step for storing an amount of vertical adjustment in one of the trimming areas positionally adjusted in the ninth step when the amount of vertical displacement is finally zero as the amount of delay of the drive timing corresponding to the amount of vertical displacement detected in the eighth step.

21. The three-dimensional imaging method as claimed in claim 20, further including:
  a 12th step for determining whether electronic shutters of the left-eye image sensor and the right-eye image sensor are rolling shutters; and
  a 13th step for setting the amount of delay of the drive timing corresponding to the amount of vertical displacement in the left-eye image sensor or the right-eye image sensor determined in 12th step as having the rolling shutter as the electronic shutter.

* * * * *